United States Patent
Chen et al.

(10) Patent No.: US 9,042,277 B2
(45) Date of Patent: May 26, 2015

(54) TRANSMISSION OF CONTROL INFORMATION FOR FDD-TDD CARRIER AGGREGATION

(75) Inventors: Wanshi Chen, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 13/443,387

(22) Filed: Apr. 10, 2012

(65) Prior Publication Data

US 2012/0257552 A1      Oct. 11, 2012

Related U.S. Application Data

(60) Provisional application No. 61/474,219, filed on Apr. 11, 2011.

(51) Int. Cl.
| | |
|---|---|
| *H04J 3/00* | (2006.01) |
| *H04J 1/00* | (2006.01) |
| *H04W 4/00* | (2009.01) |
| *H04L 5/00* | (2006.01) |
| *H04L 5/14* | (2006.01) |

(Continued)

(52) U.S. Cl.
CPC .............. *H04L 5/001* (2013.01); *H04L 5/0053* (2013.01); *H04L 5/0082* (2013.01); *H04L 5/0091* (2013.01); *H04L 5/1469* (2013.01); *H04W 72/00* (2013.01); *H04W 72/12* (2013.01)

(58) Field of Classification Search
CPC ......... H04W 72/04; H04W 76/00; H04L 5/14
See application file for complete search history.

(56) References Cited

U.S. PATENT DOCUMENTS

2010/0232373 A1*   9/2010   Nory et al. ................... 370/329
2010/0290369 A1*   11/2010  Hui et al. ..................... 370/279

(Continued)

FOREIGN PATENT DOCUMENTS

| EP | 2200208 A1 | 6/2010 |
|---|---|---|
| EP | 2282575 A1 | 2/2011 |

(Continued)

OTHER PUBLICATIONS

"DCI Formal and Blind Decoding for LTE-Advanced," 3GPP TSG-RAN WG1 Meeting #58bis, Miyazaki, Japan Oct. 12-16, 2009. Panasonic, RI-093941, pp. 1-5.

(Continued)

*Primary Examiner* — Noel Beharry
*Assistant Examiner* — Kodzovi Acolatse
(74) *Attorney, Agent, or Firm* — Patterson & Sheridan, L.L.P.

(57) ABSTRACT

Techniques for transmitting control information to support communication on multiple component carriers (CCs) are disclosed. A user equipment (UE) may be configured for operation on multiple CCs. These CCs may be associated with control messages having different definitions. For example, a control message for a CC configured for frequency division duplex (FDD) may have a different definition than a control message for a CC configured for time division duplex (TDD). A base station may send first control information for a first CC based on a definition of a control message for a second CC, instead of a definition of a control message for the first CC. The control message for the second CC may be selected for use to send the first control information based on various designs.

64 Claims, 13 Drawing Sheets

(51) Int. Cl.
  *H04W 72/00* (2009.01)
  *H04W 72/12* (2009.01)

(56) References Cited

U.S. PATENT DOCUMENTS

| | | | | |
|---|---|---|---|---|
| 2010/0303011 | A1* | 12/2010 | Pan et al. | 370/328 |
| 2010/0304689 | A1* | 12/2010 | McBeath et al. | 455/68 |
| 2011/0044261 | A1* | 2/2011 | Cai et al. | 370/329 |
| 2011/0076962 | A1 | 3/2011 | Chen et al. | |
| 2011/0274061 | A1 | 11/2011 | Li | |
| 2012/0033627 | A1 | 2/2012 | Li et al. | |

FOREIGN PATENT DOCUMENTS

| | | |
|---|---|---|
| EP | 2306782 A1 | 4/2011 |
| JP | 2013509832 A | 3/2013 |
| WO | 2010013963 A2 | 2/2010 |
| WO | 2010124628 A1 | 11/2010 |
| WO | 2011008049 A2 | 1/2011 |
| WO | 2011/053857 A1 | 5/2011 |
| WO | WO-2011053851 A2 | 5/2011 |

OTHER PUBLICATIONS

"Blind Decoding for Carrier Aggregation," 3GPP TSG-RAN WG1 Meeting #58bis, Miyazaki, Japan Oct. 12-16, 2009. Research in Motion UK Limited, R1-094117, pp. 1-3.

Ericsson et al: "TDD ACK/NACK on PUCCH", 3GPP Draft; R1-105685, 3rd Generation Partnership Project (3GPP), Mobile Competence Centre ; 650, Route Des Lucioles ; F-06921 Sophia-Antipolis Cedex ; France, vol. RAN WG1, no. Xi'an; Oct. 11, 2010, Oct. 5, 2010 XP050450712, [retrieved on Oct. 5, 2010].

Huawei: "ACK/NACK Full Bundling for Carrier Aggregation",3GPP Draft: R1-104281, 3rd Generation Partnership Project (3GPP), Mobile Competence Centre; 650, Route Des Lucioles; F-06921 Cophia-Antipolis Cedex, France, vol. RAN WG1, No. Madrid, Spain; Aug. 23, 2010, Aug. 17, 2010 XP050449650, [retrieved on Aug. 17, 2010].

International Search Report—PCT/US2012/033069—ISA/EPO—Jul. 2, 2013.

Motorola: "PDCCH Design for Carrier Aggregation and Post Rel-8 features", 3GPP Draft; R1-093417—Post Rel-8 LTE Control Channel Structure, 3rd Generation Partnership Project (3GPP), Mobile Competence Centre ; 650, Route Des Lucioles ; F-06921 Sophia-Antipolis Cedex ; France, no. Shenzhen, China; Aug. 24, 2009, XP050388131, [retrieved on Aug. 22, 2009].

NEC Group: "PHICH carrier linkage for carrier aggregation", 3GPP Draft; R1-093861-PHICH, 3rd Generation Partnership Project (3GPP), Mobile Competence Centre ; 650, Route Deslucioles ; F-06921 Sophia-Antipolis Cedex; France, No. Miyazaki; Oct. 12, 2009, XP050388366, [retrieved on Oct. 5, 2009].

Nokia Siemens Networks et al: "UL control signalling to support bandwidth extension in LTE Advanced" 3GPP Draft; R1-090724, 3rd Generation Partnership Project (3GPP), Mobile Competence Centre ; 650, Route Des Lucioles ; F-06921 Sophia-Antipolis Cedex ; France, no. Athens, Greece; Feb. 3, 2009, XP050318591 [retrieved on Feb. 3, 2009].

Samsung: "PDCCH Structure for LTE-A", 3GPP Draft; R1-084165 LTE-A PDCCH, 3rd Generation Partnership Project (3GPP), Mobile Competence Centre; 650, Route Des Lucioles, F-06921 Sophia-Antipolis Cedex, France, No. Prague, Czech Republic; Nov. 4, 2008, XP050317460, [Retrieved on Nov. 4, 2008].

ZTE: "Issues for DL Control signalling Design", 3GPP Draft; R1-093823, 3rd Generation Partnership Project (3GPP), Mobile Competence Centre; 650, Route Des Lucioles; F-06921 Sophia-Antipolis Cedex, France, No. Miyazaki; Oct. 12, 2009, XP050388334, [Retrieved on Oct. 5, 2009].

Written Opinion—PCT/US2012/033069—ISA/EPO—Jul. 2, 2013.

Partial International Search Report—PCT/US2012/033069—ISA/EPO—Dec. 21, 2012.

Ratasuk R et al.,"Carrier Aggregation in LTE-Advanced", IEEE Vehicular Technology Conference, IEEE, US, May 16, 2010, pp. 1-5, XP031696127.

* cited by examiner

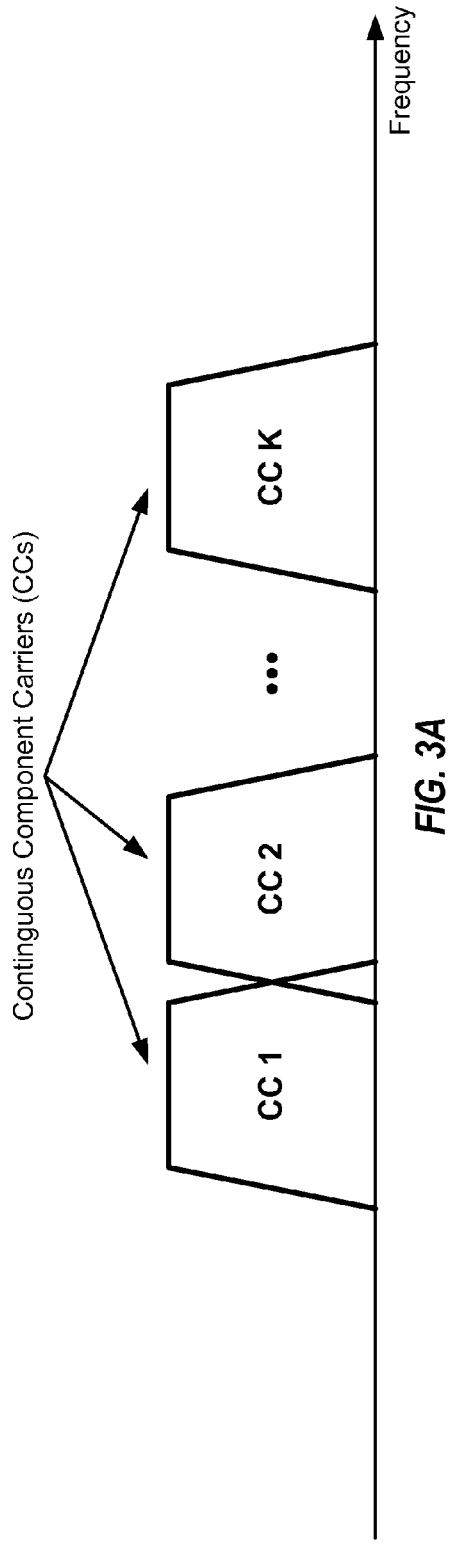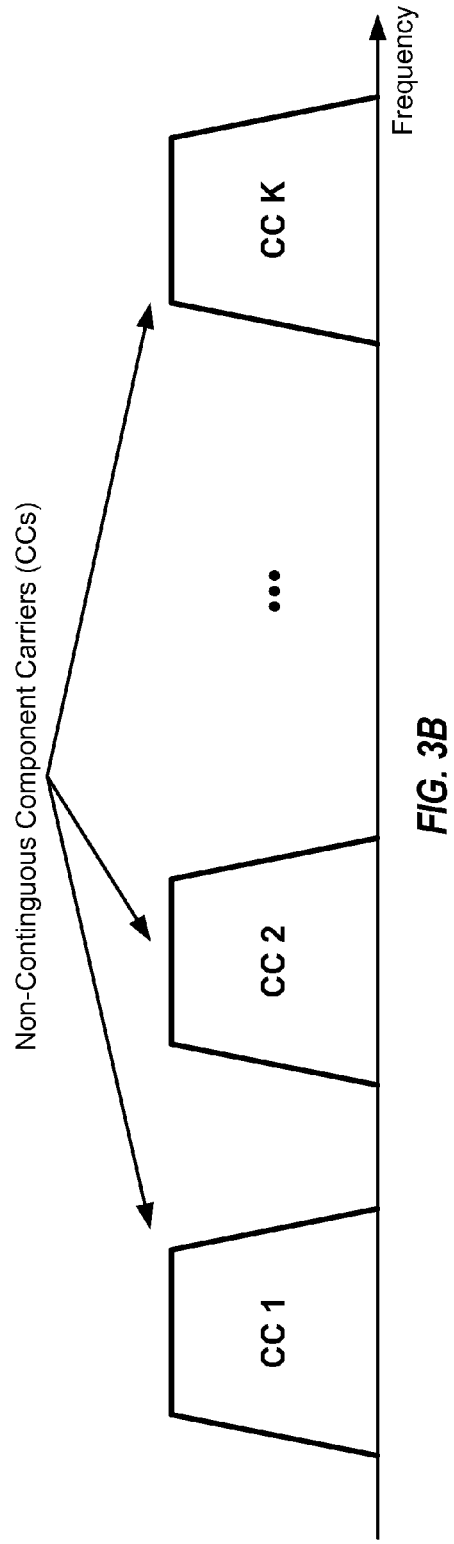

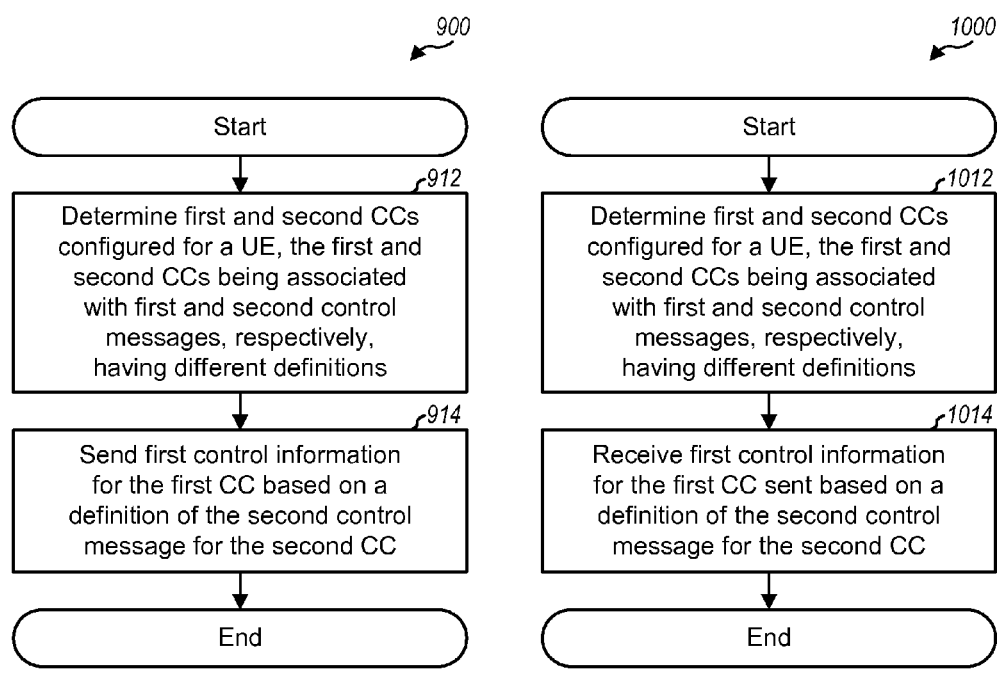

TRANSMISSION OF CONTROL INFORMATION FOR FDD-TDD CARRIER AGGREGATION

CLAIM OF PRIORITY UNDER 35 U.S.C. §119

The present application claims priority to provisional U.S. Application Ser. No. 61/474,219, entitled "SEARCH SPACE DESIGN FOR FDD-TDD CARRIER AGGREGATION," filed Apr. 11, 2011, and incorporated herein by reference in its entirety.

BACKGROUND

I. Field

The present disclosure relates generally to communication, and more specifically to techniques for transmitting control information in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple component carriers (CCs). A CC may refer to a range of frequencies used for communication and may be associated with certain characteristics. For example, a CC may be associated with system information defining operation on the CC. A CC may also be referred to as a carrier, a frequency channel, a cell, etc. A base station may send data and downlink control information (DCI) on one or more CCs to a UE. The UE may send data and uplink control information (UCI) on one or more CCs to the base station.

SUMMARY

Techniques for transmitting control information to support communication on multiple CCs are disclosed herein. A UE may be configured for operation on multiple CCs with carrier aggregation. The UE may be scheduled for data transmission on a given CC via a grant sent on the same CC without cross-carrier signaling or on another CC with cross-carrier signaling.

In one design, a base station may determine first and second CCs configured for a UE for carrier aggregation. The first and second CCs may be associated with first and second control messages, respectively, having different definitions. For example, one CC may be configured for frequency division duplex (FDD), and the other CC may be configured for time division duplex (TDD). A control message for the FDD CC may have a different definition than a control message for the TDD CC. The base station may send first control information for the first CC based on the definition of the second control message for the second CC, instead of the definition of the first control message for the first CC.

The UE may be configured with a plurality of CCs including the first and second CCs. In one design, control information for the plurality of CCs may be sent on the second CC based on a predetermined message size or a largest message size among a plurality of control messages associated with the plurality of CCs. In another design, a control message for a CC having a smaller message size may include at least one additional control information field not included in a control message for a CC having a larger message size. In yet another design, a control message for a CC carrying a downlink control channel for the UE may be used to send control information for the plurality of CCs. In yet another design, a control message for a CC carrying an uplink control channel for the UE may be used to send control information for the plurality of CCs. The various designs for sending control information for the plurality of CCs are described in detail below.

Various aspects and features of the disclosure are described in further detail below.

BRIEF DESCRIPTION OF THE DRAWINGS

FIG. 3A shows carrier aggregation with contiguous CCs.

FIG. 3B shows carrier aggregation with non-contiguous CCs.

FIG. 9 shows a process for transmitting control information.

FIG. 10 shows a process for receiving control information.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both FDD and TDD, are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Figure 1:
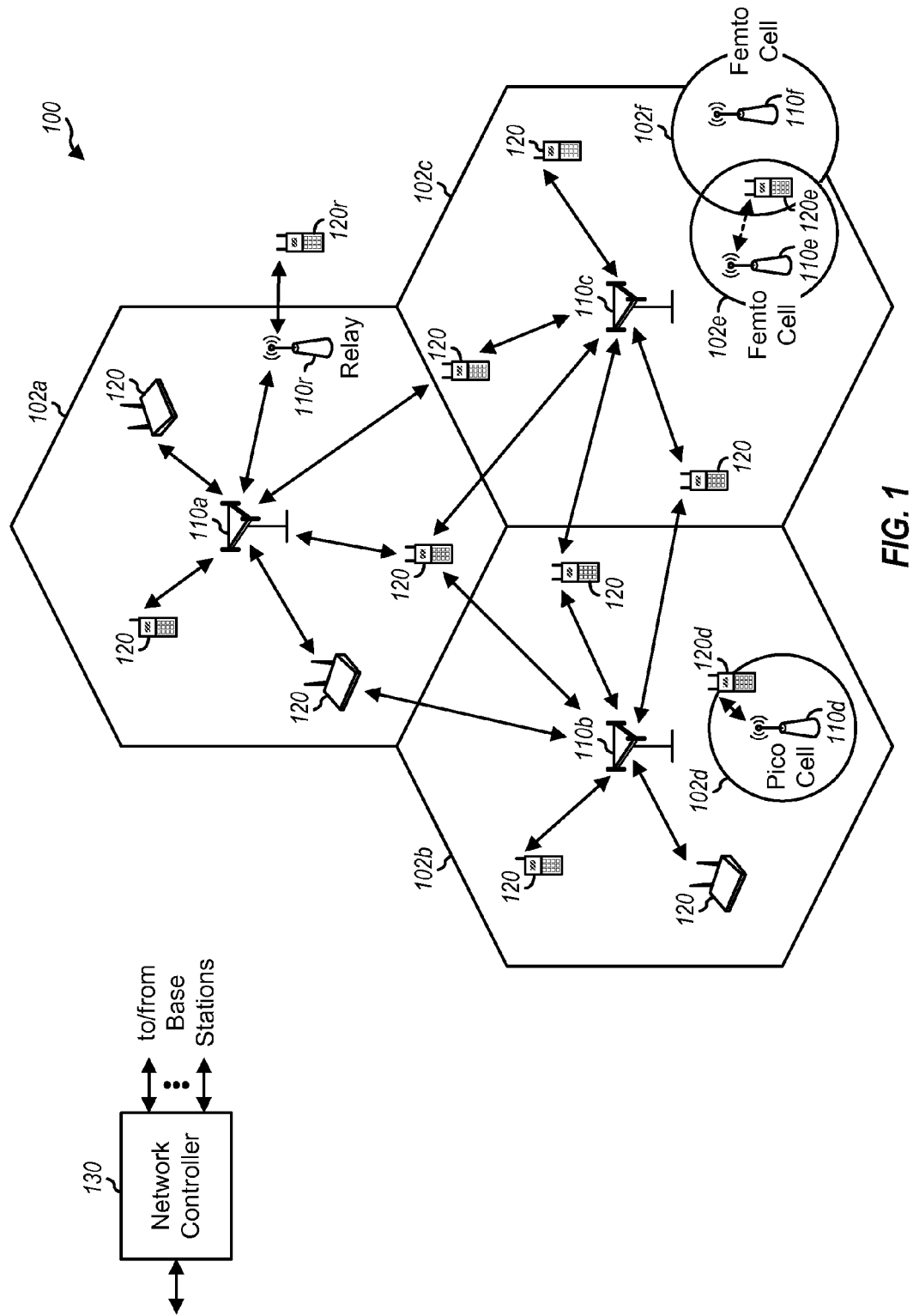
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 110a, 110b and 110c may be macro eNBs for macro cells 102a, 102b and 102c, respectively. eNB 110d may be a pico eNB for a pico cell 102d. eNBs 110e and 110f may be femto eNBs for femto cells 102e and 102f, respectively. An eNB may support one or multiple (e.g., three) cells.

Wireless network 100 may also include relays. In the example shown in FIG. 1, a relay 110r may communicate with eNB 110a and a UE 120r in order to facilitate communication between eNB 110a and UE 120r.

A network controller 130 may couple to a set of eNBs and provide coordination and control for these eNBs. Network controller 130 may communicate with the eNBs via a backhaul. The eNBs may also communicate with one another, e.g., directly or indirectly via wireless or wireline backhaul.

UEs 120 (e.g., 120d, 120e, etc.) may be dispersed throughout wireless network 100, and each UE may be stationary or mobile. A UE may also be referred to as a terminal, a mobile station, a subscriber unit, a station, etc. A UE may be a cellular phone, a smartphone, a tablet, a personal digital assistant (PDA), a wireless modem, a netbook, a smartbook, a wireless communication device, a handheld device, a laptop computer, a cordless phone, a wireless local loop (WLL) station, etc. A UE may be able to communicate with macro eNBs, pico eNBs, femto eNBs, relays, etc.

Wireless network 100 may support data transmission with hybrid automatic repeat request (HARQ) in order to improve reliability. For HARQ, a transmitter (e.g., an eNB) may send an initial transmission of a packet and may send one or more additional transmissions of the packet, if needed, until the packet is decoded correctly by a receiver (e.g., a UE), or the maximum number of transmissions of the packet has occurred, or some other termination condition is encountered. After each transmission of the packet, the receiver may send an acknowledgement (ACK) if the packet is decoded correctly or a negative acknowledgement (NACK) if the packet is decoded in error. The transmitter may send another transmission of the packet if a NACK is received and may terminate transmission of the packet if an ACK is received. A packet may also be referred to as a transport block, a codeword, a data block, etc.

Wireless network 100 may utilize FDD and/or TDD. For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods.

Figure 2A:
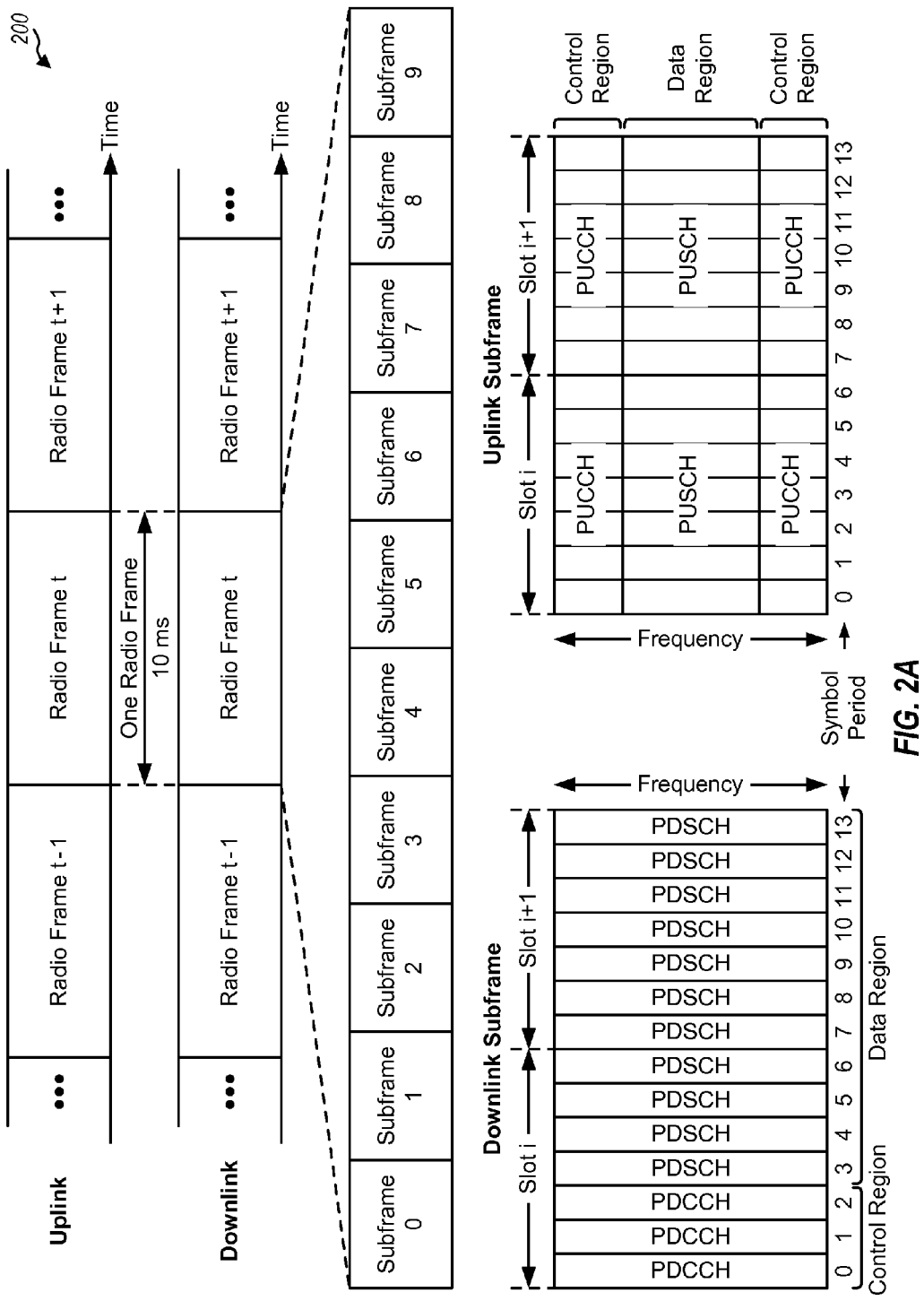
FIG. 2A shows an exemplary frame structure for FDD.

FIG. 2A shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2A) or six symbol periods for an extended cyclic prefix. The 2L symbol periods in each subframe may be assigned indices of 0 through 2L-1.

Figure 2B:
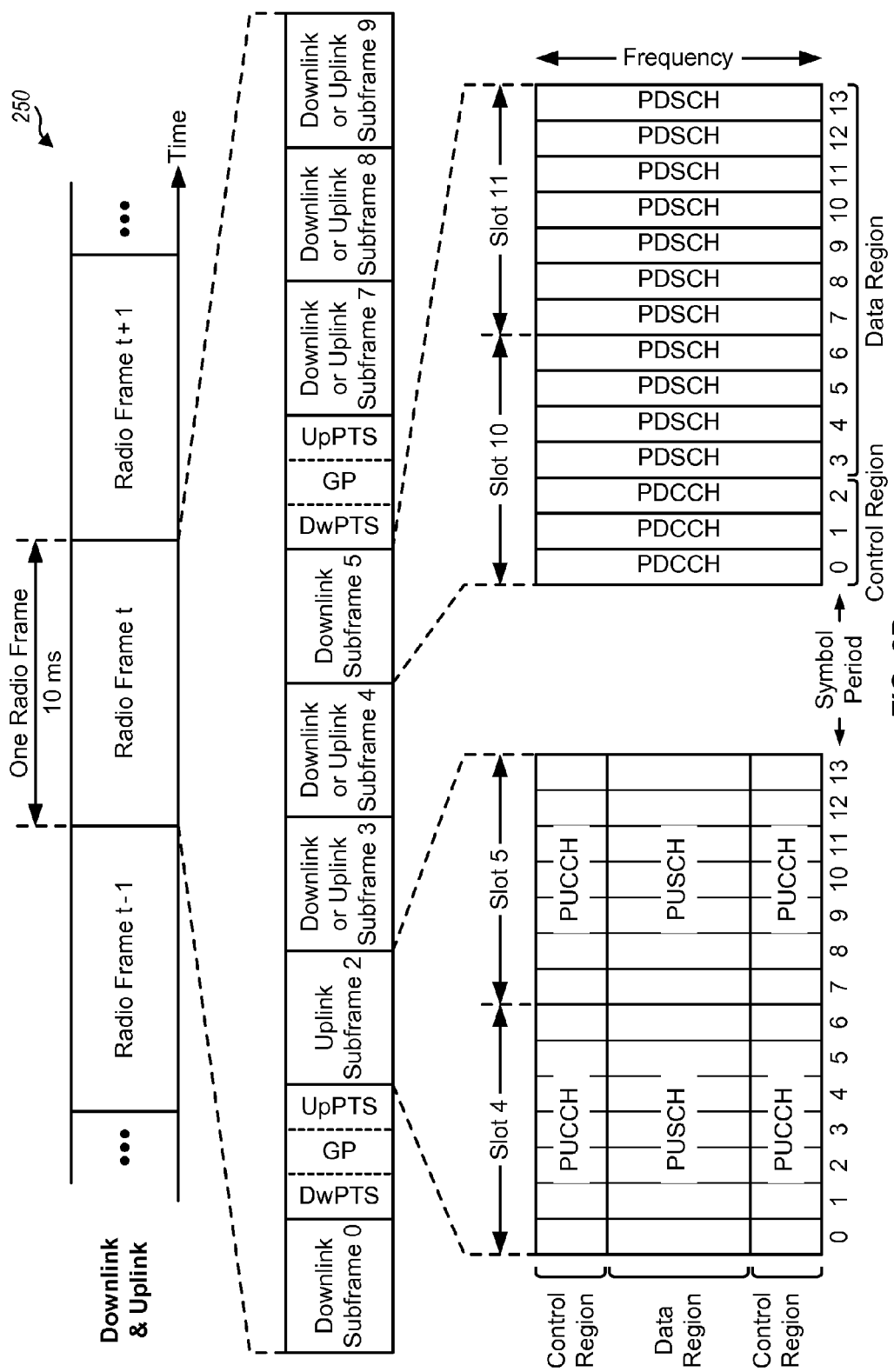
FIG. 2B shows an exemplary frame structure for TDD.

FIG. 2B shows an exemplary frame structure 250 for TDD in LTE. The transmission timeline for the downlink and uplink may be partitioned into units of radio frames, and each radio frame may be partitioned into 10 subframes with indices of 0 through 9. LTE supports a number of uplink-downlink configurations for TDD. Each uplink-downlink configuration indicates whether each subframe is a downlink subframe, an uplink subframe, or a special subframe. Subframes 0 and 5 are used for the downlink and subframe 2 is used for the uplink for all uplink-downlink configurations. Subframes 3, 4, 7, 8 and 9 may each be used for the downlink or uplink depending on the uplink-downlink configuration. Subframe 1 includes a Downlink Pilot Time Slot (DwPTS), a Guard Period (GP), and an Uplink Pilot Time Slot (UpPTS). Subframe 6 may include only the DwPTS, or all three special fields, or a downlink subframe depending on the uplink-downlink configuration.

For both FDD and TDD, a subframe for the downlink may be referred to as a downlink subframe. A subframe for the uplink may be referred to as an uplink subframe. A CC configured for FDD may be referred to as an FDD CC. A CC configured for TDD may be referred to as a TDD CC.

For both FDD and TDD, a cell may transmit a Physical Downlink Control Channel (PDCCH), a Physical HARQ Indicator Channel (PHICH), and/or other physical channels in a control region of a downlink subframe. The PDCCH may carry downlink control information (DCI) such as downlink grants, uplink grants, etc. The PHICH may carry ACK/NACK feedback for data transmission sent on the uplink with HARQ. The cell may also transmit a Physical Downlink Shared Channel (PDSCH) and/or other physical channels in a data region of a downlink subframe. The PDSCH may carry data for UEs scheduled for data transmission on the downlink. A UE may transmit either a Physical Uplink Control Channel (PUCCH) in a control region of an uplink subframe or a Physical Uplink Shared Channel (PUSCH) in a data region of the uplink subframe. The PUCCH may carry uplink control information (UCI) such as channel state information (CSI), ACK/NACK, scheduling request, etc. The PUSCH may carry data and/or UCI. The various signals and channels in LTE are described in 3GPP TS 36.211, entitled "Evolved Universal Terrestrial Radio Access (E-UTRA); Physical Channels and Modulation," which is publicly available.

Wireless network 100 may support operation with multiple CCs, which may be referred to as carrier aggregation or multi-carrier operation. A UE may be configured with multiple CCs for the downlink and one or more CCs for the uplink for carrier aggregation. A CC for the downlink may be referred to as a downlink CC. A CC for the uplink may be referred to as an uplink CC. An eNB may send data and DCI on one or more CCs to the UE. The UE may send data and UCI on one or more CCs to the eNB.

FIG. 3A shows an example of continuous carrier aggregation. K CCs may be available for communication and may be adjacent to each other, where K may be any integer value.

FIG. 3B shows an example of non-continuous carrier aggregation. K CCs may be available for communication and may be separate from each other.

In LTE Release 10, for example, a UE may be configured with up to five CCs for carrier aggregation. Each CC may have a bandwidth of up to 20 MHz and may be backward compatible with LTE Release 8. The UE may thus be configured with up to 100 MHz for up to five CCs. One CC may be designated as a primary CC (PCC), and the remaining CCs may be referred to as secondary CCs (SCCs). An eNB may transmit the PDCCH on the PCC, and the UE may transmit the PUCCH on the PCC. Two or more CCs may also be configured as PCCs so that UCI can be sent on the PUCCH on two or more CCs.

Figure 4A:
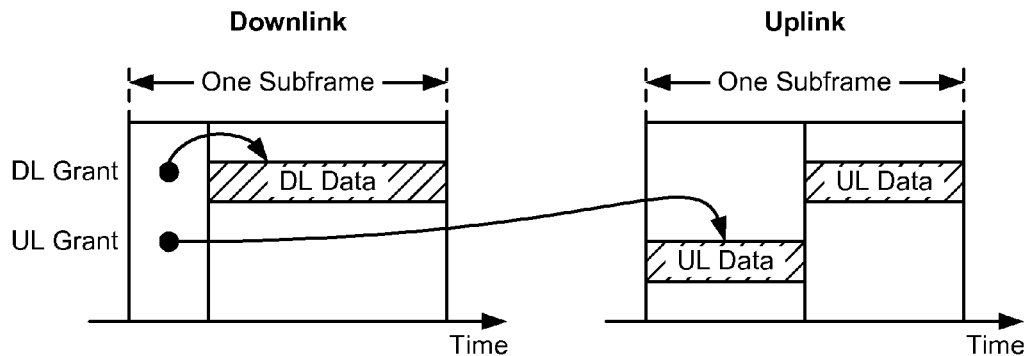
FIG. 4A shows single-carrier operation.

FIG. 4A shows an example of single-carrier operation. A UE may operate on a single CC for communication with an eNB. The eNB may send a downlink (DL) grant and/or an uplink (UL) grant for the UE on the PDCCH in the control region of a downlink subframe. The downlink grant may comprise various parameters for data transmission from the eNB to the UE. The uplink grant may comprise various parameters for data transmission from the UE to the eNB. The eNB may send data transmission to the UE on the PDSCH in the data region of the downlink subframe. The UE may send data transmission to the eNB on the PUSCH in the data region of an uplink subframe.

Figure 4B:
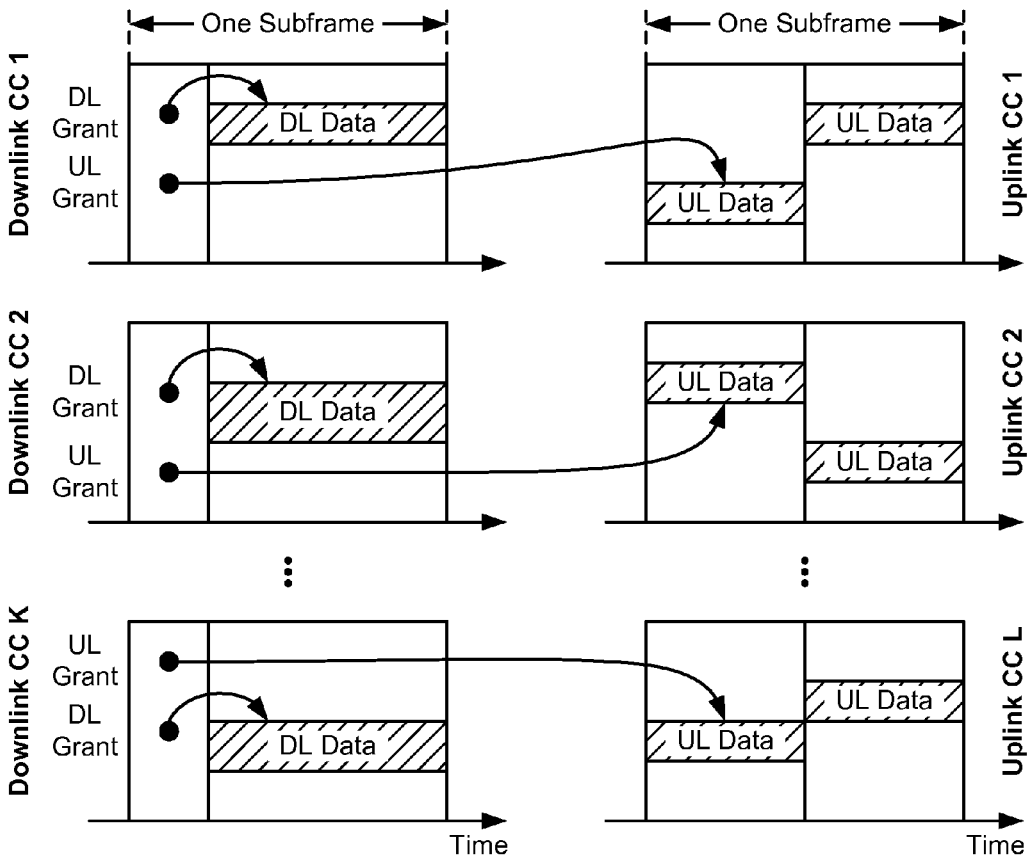
FIG. 4B shows carrier aggregation without cross-carrier signaling.

FIG. 4B shows an example of carrier aggregation without cross-carrier signaling. A UE may be configured with multiple CCs for carrier aggregation. Each CC for the downlink may be paired or associated with one CC for the uplink, e.g., via higher layer configuration. A pair of downlink CC and uplink CC may be referred to as a cell. Control information (e.g., grants) may be sent on a downlink CC to support data transmission on the downlink CC and the paired uplink CC.

Figure 4C:
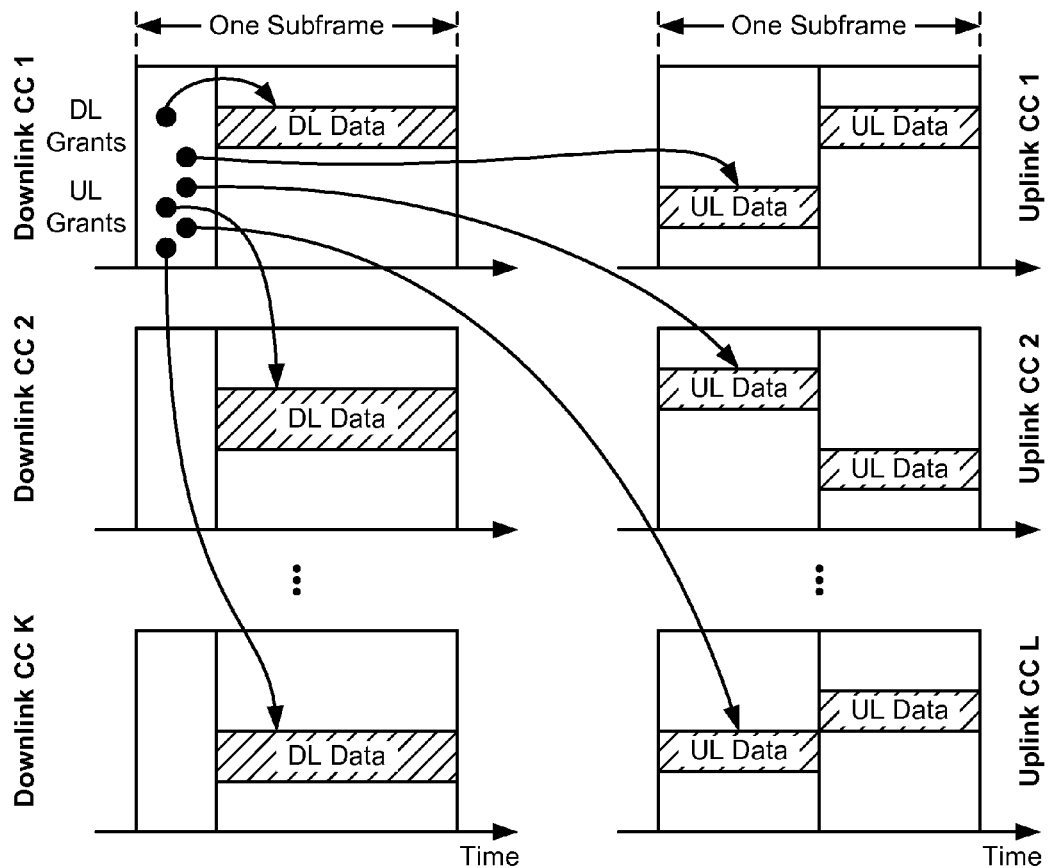
FIG. 4C shows carrier aggregation with cross-carrier signaling.

FIG. 4C shows an example of carrier aggregation with cross-carrier signaling. Cross-carrier signaling refers to sending control information on one CC to support data transmission on another CC. For example, a downlink grant may be sent on one CC to schedule data transmission on another CC.

LTE supports a number of DCI formats that may be used to send DCI on the downlink. Table 1 lists a set of DCI formats supported by LTE. DCI format 0 may be used to send uplink grants for data transmission on the uplink. DCI formats 1, 1A, 1B, 1C and 1D may be used to send downlink grants for transmission of one codeword/packet on the downlink. DCI formats 2, 2A and 2B may be used to send downlink grants for transmission of two codewords on the downlink for multiple-input multiple output (MIMO). DCI formats 3 and 3A may be used to send transmit power control (TPC) information to UEs. DCI formats 0, 1A, 3 and 3A have the same size. DCI formats 1, 1B, 1C, 1D, 2, 2A and 2B may have different sizes.

TABLE 1

DCI Formats

| DCI Format | Description |
| --- | --- |
| 0 | Used for scheduling uplink transmission on the PUSCH. |
| 1 | Used for scheduling transmission of one codeword on the PDSCH. |
| 1A | Used for compact scheduling of one codeword on the PDSCH and for random access procedure. |
| 1B | Used for compact scheduling of one codeword on the PDSCH with precoding information. |
| 1C | Used for very compact scheduling of one codeword on the PDSCH. |
| 1D | Used for compact scheduling of one codeword on the PDSCH with precoding and power offset information. |
| 2 | Used for scheduling two codewords on the PDSCH with closed-loop spatial multiplexing with cell-specific reference signal (CRS). |
| 2A | Used for scheduling two codewords on the PDSCH with open-loop spatial multiplexing with CRS. |
| 2B | Used for scheduling two codewords on the PDSCH with spatial multiplexing with precoded UE-specific reference signal. |
| 3 | Used for transmission of TPC commands for the PUCCH and PUSCH with 2-bit power adjustments. |
| 3A | Used for transmission of TPC commands for the PUCCH and PUSCH with 1-bit power adjustments. |

Table 1 lists a set of DCI formats supported by LTE Release 9, for example. Other DCI formats may also be supported, e.g., DCI format 2C in LTE Release 10 and other DCI formats in future LTE releases. The DCI formats in Table 1 are described in 3GPP TS 36.212, entitled "Evolved Universal Terrestrial Radio Access (E-UTRA); Multiplexing and channel coding," which is publicly available. 3GPP TS 36.212 also describes various fields of each DCI format.

A UE may be semi-statically configured by higher layers with a downlink transmission mode in a set of downlink transmission modes. Each downlink transmission mode may be associated with one or more DCI formats used for downlink grants and one or more DCI formats used for uplink grants. Each downlink transmission mode may be associated with up to two DCI sizes in LTE Releases 8 and 9 and up to three DCI sizes in LTE Release 10.

An eNB may send DCI to a UE on the PDCCH using any one of the DCI formats configured for the UE. The eNB may also send DCI on the PDCCH in 1, 2, 4 or 8 control channel elements (CCEs), which correspond to an aggregation level of 1, 2, 4 or 8, respectively. Each CCE includes nine resource elements, and each resource element covers one subcarrier in one symbol period. Different aggregation levels may be used for different levels of protection for DCI.

The UE may be configured for operation on multiple CCs with carrier aggregation. The UE may have a common search space for only its primary CC and may have a UE-specific search space for each CC configured for the UE. The eNB may send DCI to the UE only in certain CCEs, which may be located in the common search space and the UE-specific search spaces for the UE. The common search space may be applicable to all UEs and may be used for broadcast (e.g., system information, paging, RACH response, etc.) and unicast scheduling (e.g., grants). The UE-specific search spaces may be specific to the UE and may be used to send grants, etc.

The UE may have a number of decoding candidates in the common search space and the UE-specific search spaces of the UE. Each decoding candidate may correspond to a specific set of CCEs on which DCI can be sent to the UE. The set of decoding candidates in the UE-specific search space for each configured CC may be determined based on a UE ID and other parameters such as a subframe index.

For each decoding candidate, the UE may perform a blind decode for each DCI size available for that decoding candidate. The DCI size determines the number of information bits to send, which in turn affects the code rate. The total number of blind decodes may then be dependent on the number of decoding candidates and the number of DCI sizes.

Table 2 lists the number of decoding candidates monitored by the UE for different aggregation levels in the common and UE-specific search spaces. Table 2 also lists the number of blind decodes for each aggregation level. For the common search space, up to two DCI sizes may be available for each decoding candidate. The UE may perform up to 12 blind decodes for the six decoding candidates in the common search space. For the UE-specific search space for a configured CC, up to two DCI sizes may be available for each decoding candidate in LTE Release 8 or 9, and up to three DCI sizes may be available for each decoding candidate in LTE Release 10. One DCI size may be used for compact DCI formats for downlink and uplink, a second DCI size may be used for a DCI format that is dependent on a downlink transmission mode (e.g., MIMO), and a third DCI size may be used for uplink MIMO operation (e.g., in LTE Release 10). Downlink grants and uplink grants may share the same set of decoding candidates. The UE may perform up to 32 blind decodes (e.g., for LTE Release 8 or 9) or up to 48 blind decodes (e.g., for LTE Release 10) for the 16 decoding candidates in the UE-specific search space.

TABLE 2

Decoding Candidates Monitored by a UE

| Type | Aggregation Level | Search Space Size (in CCEs) | Number of Decoding Candidates | Number of DCI Sizes | Number of Blind Decodes |
|---|---|---|---|---|---|
| UE-Specific Search Space | 1 | 6 | 6 | 2 or 3 | 12 or 18 |
|  | 2 | 12 | 6 | 2 or 3 | 12 or 18 |
|  | 4 | 8 | 2 | 2 or 3 | 4 or 6 |
|  | 8 | 16 | 2 | 2 or 3 | 4 or 6 |
| Common Search Space | 4 | 16 | 4 | 2 | 8 |
|  | 8 | 16 | 2 | 2 | 4 |

The UE may be configured for operation on multiple CCs. If there is cross-carrier signaling (e.g., as shown in FIG. 4C), then a given CC may carry DCI for itself as well as one or more other CCs. A CC carrying DCI may be referred to as a PDCCH CC. A CC for which DCI is sent may be referred to as a PDSCH/PUSCH CC. The PDCCH CC may have a UE-specific search for each PDSCH/PUSCH CC whose DCI is sent on the PDCCH CC. The PDCCH CC may have multiple UE-specific search spaces for multiple PDSCH/PUSCH CCs. These UE-specific search spaces may or may not overlap. The UE-specific search space for each PDSCH/PUSCH CC may be determined in similar manner as in LTE Release 8, albeit with a 3-bit CIF (cross-carrier indicator field).

Figure 5:
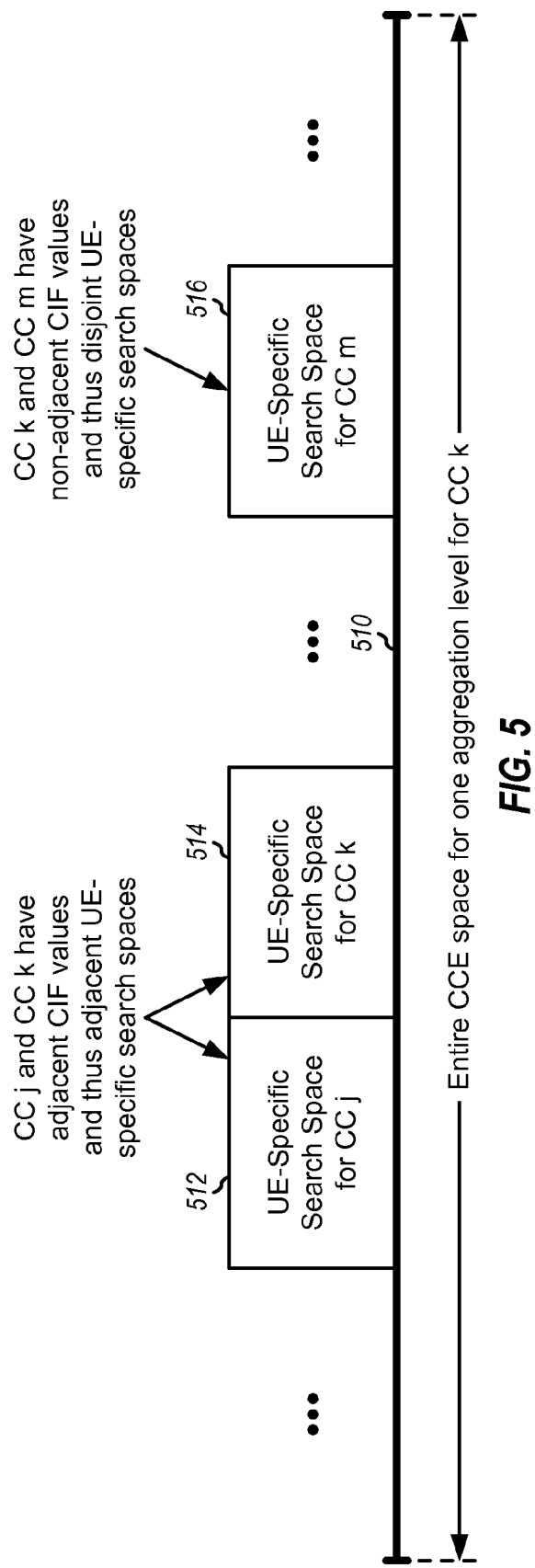
FIG. 5 shows an example of multiple UE-specific search spaces for a CC with cross-carrier signaling.

FIG. 5 shows an example of multiple UE-specific search spaces on a PDCCH CC with cross-carrier signaling. In this example, CC k carries DCI for CC j, CC k, and CC m. The entire CCE space for CC k for a given aggregation level (e.g., 1, 2, 4 or 8) may be represented by a line 510. CC j, CC k, and CC m are associated with three UE-specific search spaces 512, 514 and 516, respectively, which span different ranges of CCE indices. The starting CCE index for the UE-specific search space for each CC is equal to the starting CCE index for that CC for single-carrier operation in LTE Release 8 plus an offset. The offset is equal to the CIF value for the CC times the aggregation level and further times the number of decoding candidates. CC j and CC k may have adjacent CIF values and their UE-specific search spaces may be adjacent to one another, as shown in FIG. 5. CC k and CC m may have non-adjacent CIF values and their UE-specific search spaces may be separated from one another, as also shown in FIG. 5. The UE-specific search space for CC k with cross-carrier signaling may (i) match the UE-specific search space for CC k in single-carrier operation if CC k has a CIF value of zero or (ii) not match otherwise.

The UE-specific search spaces for multiple CCs may be shared to send DCI to the UE, which may be referred to as search space sharing. A set of CCs mapped to the PDCCH CC may have the same DCI size. DCI of that size for any CC in the set can be sent on the PDCCH CC in the UE-specific search space for any CC in the set. Sharing the UE-specific search spaces may provide scheduling flexibility since DCI can be sent on any of the UE-specific search spaces. Search space sharing may not increase the maximum number of blind decodes since the UE may perform blind decodes for the UE-specific search space for each CC anyway.

Figure 6:
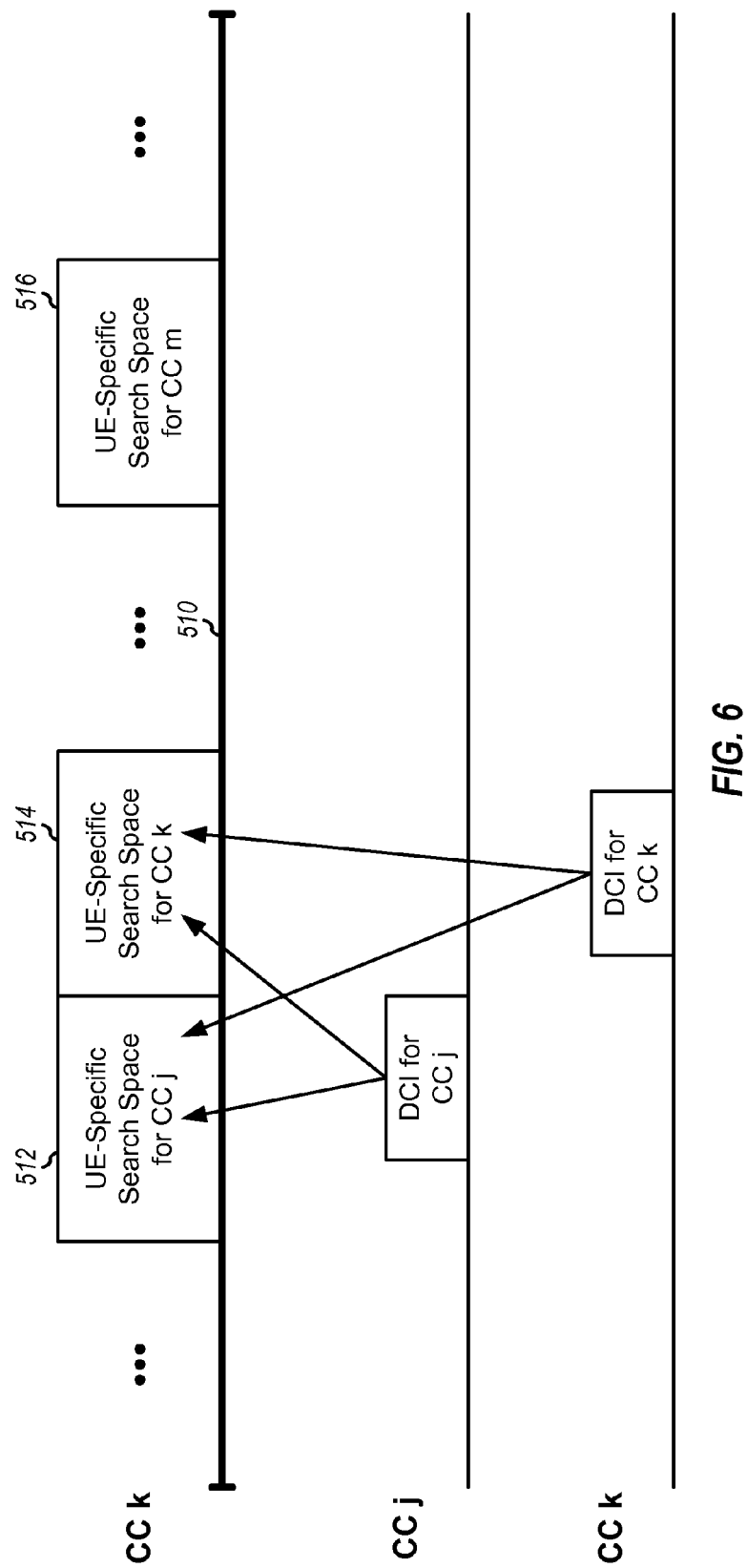
FIG. 6 shows an example of search space sharing.

FIG. 6 shows an example of search space sharing. In this example, CC j and CC k have the same DCI size associated with DCI format X for CC j and DCI format Y for CC k. DCI of DCI format X for CC j (and also DCI of DCI format Y for CC k) may be sent on CC k in the UE-specific search space for CC j or the UE-specific search space for CC k. The UE-specific search spaces for CC j and CC k may thus be shared by these two CCs having the same DCI size.

LTE Release 10 supports carrier aggregation for multiple CCs with the same configuration. In particular, all CCs for carrier aggregation are configured for either FDD or TDD, and a mixture of FDD CCs and TDD CCs are not allowed. Furthermore, if the CCs are configured for TDD, then all CCs for carrier aggregation have the same uplink-downlink configuration, although special subframes may be configured separately for different CCs. Restricting all CCs to have the same FDD or TDD configuration as well as the same uplink-downlink configuration may simplify operation.

LTE Release 11 and/or later may support carrier aggregation for multiple CCs with different configurations. For example, an aggregation of FDD CCs and TDD CCs may be supported. As another example, an aggregation of TDD CCs with different uplink-downlink configurations may be supported. Supporting CCs with different configurations may provide more flexibility in deployment. Each CC may be backward compatible to a single CC in LTE Release 8, 9 or 10 in a single carrier mode. It may also be possible to support non-backward compatible CCs, e.g., CC segments, extension CCs, etc.

Figure 7:
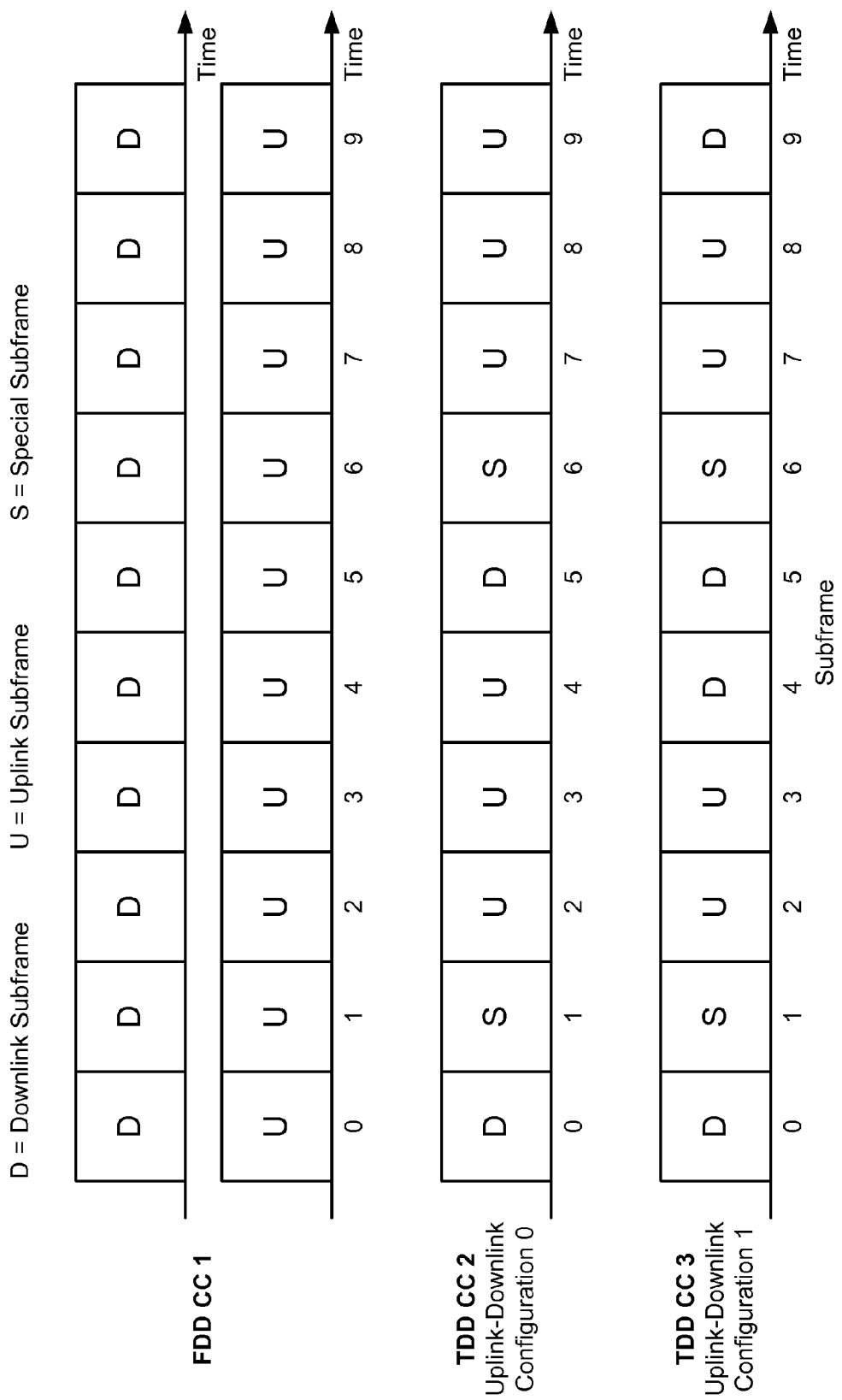
FIG. 7 shows an example of three CCs with different configurations.

FIG. 7 shows an example of three CCs with different configurations. In this example, CC 1 is configured for FDD and includes a downlink CC/frequency channel and an uplink CC/frequency channel. The downlink CC includes downlink subframes, which are denoted as "D" in FIG. 7. The uplink CC includes uplink subframes, which are denoted as "U" in FIG. 7. CC 2 is configured for TDD with uplink-downlink configuration 0. Subframes 0 and 5 of CC 2 are downlink subframes, subframes 1 and 6 of CC 2 are special subframes, and remaining subframes 2-4 and 7-9 of CC 2 are uplink subframes. CC 3 is configured for TDD with uplink-downlink configuration 1. Subframes 0, 4, 5 and 9 of CC 3 are downlink subframes, subframes 1 and 6 of CC 3 are special subframes, and remaining subframes 2, 3, 7 and 8 of CC 3 are uplink subframes.

Cross-carrier signaling for multiple CCs with different configurations may be challenging. A TDD CC may carry control information for data transmission on an FDD. Grants may be sent in only downlink subframes and special subframes of the TDD CC while data transmission may be sent in all subframes of the FDD CC. This discrepancy may be addressed in several manners. In one design, data transmission may be scheduled in only subframes of the FDD CC that correspond to the downlink and special subframes of the TDD CC in a HARQ timeline. For example, a downlink grant may be sent four subframes earlier than a data transmission scheduled by the downlink grant. In this case, data transmission may be scheduled in only subframes of the FDD CC that are four subframes later than the downlink and special subframes of the TDD CC. This design may enable reuse of existing control mechanisms for data transmission with HARQ. However, some subframes of the FDD CC cannot be scheduled with cross-carrier signaling on the TDD CC, which may be undesirable. In another design, the downlink and special subframes of the TDD CC may schedule data transmission on all subframes of the FDD CC with cross-subframe control. For example, a grant may be sent on the TDD CC and may indicate that it is for data transmission in a subframe of the FDD CC that is more than four subframes away.

Conversely, an FDD CC may carry control information for data transmission on a TDD CC. Downlink grants may be sent in some subframes of the FDD CC to schedule data transmission in downlink subframes of the TDD CC, and uplink grants may be sent in some other subframes of the FDD CC to schedule data transmission in uplink subframes of the TDD CC. In one design, grants may be sent in specific subframes of the FDD CC to schedule data transmission in specific subframes of the TDD CC. The specific subframes in which to send grants on the FDD CC may be determined based on a HARQ timeline defined for TDD, or a HARQ timeline defined for FDD, or a flexible HARQ timeline. A grant for data transmission in a given subframe may be sent (i) four subframes earlier in the HARQ timeline for FDD or (ii) a variable number of subframes earlier for the HARQ timeline for TDD. For the flexible HARQ timeline, each subframe of the TDD CC may be scheduled in a specific subframe or in multiple subframes of the FDD CC. The flexible HARQ timeline may enable more subframes of the FDD CC to be used to send grants for the TDD CC.

FDD and TDD may be associated with different DCI sizes for a given DCI format even when the same system bandwidth, the same downlink/uplink transmission mode, and the same number of transmit antennas are used for FDD and TDD CCs. For example, DCI format 1A for a downlink grant for one codeword may have different sizes for FDD and TDD. Table 3 lists the fields of DCI format 1A as well as the bitwidth of each field for FDD and TDD. DCI format 1A for FDD includes a 3-bit HARQ process ID and no downlink assignment index (DAI) and has an overall bitwidth of 44 bits. DCI format 1A for TDD includes a 4-bit HARQ process ID and a 2-bit DAI and has an overall bitwidth of 47 bits. Other DCI formats may also be associated with different sizes for FDD and TDD.

TABLE 3

DCI Format 1A

| Field | Bitwidth for FDD | Bitwidth for TDD |
| --- | --- | --- |
| Flag DCI format 0/1A differentiation | 1 | 1 |
| Localized/distributed VRB assignment flag | 1 | 1 |
| Resource allocation | 13 | 13 |
| Modulation and coding scheme (MCS) | 5 | 5 |
| HARQ process ID | 3 | 4 |
| New data indicator | 1 | 1 |
| Redundancy version | 2 | 2 |
| Transmit power control (TPC) | 2 | 2 |
| Downlink assignment index (DAI) | 0 | 2 |
| Cyclic redundancy check (CRC) | 16 | 16 |
| Total number of bits | 44 | 47 |

Although not shown in Table 3, a DCI format may include a CIF to support cross-carrier signaling. A UE may be configured with multiple CCs for carrier aggregation, and each CC may be assigned a unique index. The CIF may include 3 bits to convey an index of a CC for which DCI is applicable.

In general, a UE may be configured with a plurality of CCs for carrier aggregation. The plurality of CCs may be associated with a plurality of control messages of the same format/type (e.g., DCI format 1A). The plurality of control messages may have different definitions, which may be characterized in various manners. For example, different control messages may be associated with different sets of control information fields, different bitwidths for a given control information field, different message sizes, etc. Control information for a given CC X may be sent based on a definition of a control message for another CC Y.

It may be desirable to support search space sharing for a combination of FDD and TDD CCs with cross-carrier signaling. However, a DCI format may be associated with different definitions and/or sizes for FDD and TDD, e.g., as shown in Table 3. This may result in more blind decodes for search space sharing. For example, DCI for an FDD CC and DCI for a TDD CC may be sent in UE-specific search spaces for the FDD and TDD CCs on the FDD CC. A UE may need to perform a first set of blind decodes for a first DCI size for the FDD CC and a second set of blind decodes for a second DCI size for the TDD CC. As an example, for one UE-specific search space, the UE may perform 16 blind decodes for DCI format 1A with 44 bits for FDD and another 16 blind decodes for DCI format 1A with 47 bits for TDD. The different sizes of DCI format 1A for FDD and TDD may thus double the number of blind decodes by the UE. The UE may need to perform twice the number of blind decodes to support search space sharing for the FDD and TDD CCs.

In an aspect of the present disclosure, various schemes may be used to support search space sharing for FDD and TDD CCs with cross-carrier signaling without increasing the number of blind decodes. These schemes may ensure that the same DCI definition and/or size is used for both FDD and TDD CCs, e.g., for the same system bandwidth, number of transmit antennas, and downlink/uplink transmission mode. This may enable a UE to perform one set of blind decodes for one DCI definition and/or size for both FDD and TDD CCs. Additionally, some schemes may provide more efficient downlink and/or uplink control, scheduling, and HARQ operation.

In a first scheme of supporting search space sharing for FDD and TDD CCs, the largest size of a given DCI format may be selected for use from among different sizes of the DCI format for all CCs. Zero padding may be used for the DCI format of each CC associated with a DCI size that is smaller than the largest DCI size. For example, a DCI size of 47 bits may be selected for DCI format 1A for both FDD and TDD CCs. DCI of DCI format 1A for a TDD CC may be sent with 47 bits in the normal manner. DCI of DCI format 1A for an FDD CC may be padded with three zeros to obtain 47 bits, and the zero-padded DCI may be sent for the FDD CC. A UE may perform blind decodes for a DCI size of 47 bits for both FDD and TDD CCs. The UE may determine whether a received DCI is for an FDD CC or a TDD CC based on a CIF included in the DCI or CC linkage/pairing configured by higher layers.

In a second scheme of supporting search space sharing for FDD and TDD CCs, a CIF may be included in DCI formats for FDD but may be omitted from DCI formats for TDD. For example, DCI format 1A for FDD may include a 3-bit CIF and may have a size of 47 bits. DCI format 1A for TDD may exclude the CIF and may have a size of 47 bits. DCI format 1A for both FDD and TDD CCs would then have the same size of 47 bits. Cross-carrier signaling may be supported for FDD CCs based on the CIF. The CIF may be included in a downlink grant to indicate a specific CC on which data transmission is scheduled by the downlink grant. Cross-carrier signaling may be supported for TDD CCs based on CC linkage/pairing configured by higher layers. In general, one or more fields may be added to a DCI format of a smaller size so that DCI formats for FDD and TDD have the same size.

In a third scheme of supporting search space sharing for FDD and TDD CCs and providing more efficient downlink and/or uplink operations, which may be referred to as DCI format alignment, DCI may be sent using a DCI format definition of a CC carrying the DCI, and not the DCI format definition of a CC for which the DCI is intended. In one scenario, DCI may be sent on a TDD CC to schedule data transmission on an FDD CC. The DCI may be sent using a DCI format for TDD instead of a DCI format for FDD. For DCI format 1A shown in Table 3, the DCI may include a 4-bit HARQ process ID for TDD (instead of a 3-bit HARQ process ID for FDD) and a 2-bit DAI for TDD. Data transmission may be sent based on the HARQ timeline for TDD, which may be readily supported with the DCI format for TDD.

In another scenario, DCI may be sent on an FDD CC to schedule data transmission on a TDD CC. Additionally or separately, UCI for a TDD CC may be sent via the PUCCH on a FDD CC. The DCI may be sent using a DCI format for FDD instead of a DCI format for TDD. For DCI format 1A shown in Table 3, the DCI may include a 3-bit HARQ process ID for FDD (instead of a 4-bit HARQ process ID for TDD) and no DAI (instead of a 2-bit DAI for TDD). Data transmission may be sent based on the HARQ timeline for FDD, which may be readily supported with the DCI format for FDD.

For the third scheme, the definition and/or size of a given DCI format may be dependent on a CC on which DCI is sent (and not on a CC for which the DCI is intended). For example, a downlink grant of DCI format 1A for a TDD CC may have the definition of DCI format 1A for FDD and a size of 44 bits when it is sent on an FDD CC even though it may be for data transmission on the TDD CC. In this case, some information in the downlink grant for TDD (e.g., the DAI and part of the HARQ process ID) may be omitted to fit DCI format 1A for FDD and to reduce the number of bits to 44 for FDD. Conversely, a downlink grant of DCI format 1A for an FDD CC may have the definition of DCI format 1A for TDD and a size of 47 bits when it is sent on a TDD CC even though it may be for data transmission on the FDD CC. In this case, one or more fields (e.g., the DAI and HARQ process ID) may be added or extended in the downlink grant for FDD to fit DCI format 1A for TDD and to obtain the number of bits for TDD.

In a fourth scheme of supporting search space sharing for FDD and TDD CCs and providing more efficient downlink and/or uplink operations, DCI may be sent using a DCI format for the primary CC carrying UCI on the PUCCH, and not a DCI format of a CC for which the DCI is applicable. In one scenario, UCI for an FDD CC may be sent via the PUCCH on a TDD CC. DCI scheduling data transmission on an FDD CC may be sent using a DCI format for TDD instead of a DCI format for FDD, even if the DCI is sent on the FDD CC. The HARQ timeline for the FDD CC may be based on the HARQ timeline defined for the TDD CC. The 2-bit DAI originally defined for TDD may be used for FDD downlink data transmissions for more efficient ACK/NACK feedback via the PUCCH on the TDD CC. The 2-bit DAI may also be beneficial if the ACK/NACK feedback is transmitted via the PUSCH. In another scenario, UCI for a TDD CC may be sent via the PUCCH on an FDD CC. DCI scheduling data transmission on a TDD CC may be sent using a DCI format for FDD instead of a DCI format for TDD. The HARQ timeline for the TDD CC may be based on the HARQ timeline defined for the FDD CC. The 2-bit DAI originally defined for TDD may be omitted and the 4-bit HARQ process ID originally defined for TDD may be reduced to 3-bit, resulting in less downlink control overhead.

Four schemes for supporting search space sharing and more efficient downlink and/or uplink operations for FDD and TDD CCs have been described above. Search space sharing for FDD and TDD CCs may also be supported in other manners.

The schemes described above may be used to support search space sharing for FDD and TDD CCs, as described above. In general, these schemes may support search space sharing for multiple CCs normally associated with different definitions and/or sizes for a given DCI format, e.g., due to FDD and TDD and/or for other reasons. The same definition and/or size may be used for a given DCI format for multiple CCs, so that a UE can perform a single set of blind decodes for one definition and/or size for the given DCI format for all CCs. This may enable more efficient search space sharing for the multiple CCs without increasing the maximum number of blind decodes by the UE. This may also enable more efficient downlink and/or uplink operations.

DCI may be sent on an FDD CC to schedule data transmission on a TDD CC. In this case, downlink grants for the TDD CC may be sent on the PDCCH in some subframe of the FDD CC, and both downlink and uplink grants for the TDD CC may be sent on the PDCCH in some other subframes of the FDD CC. The load of the PDCCH may be unbalanced across subframes of the FDD CC and may result in different numbers of blind decodes for different subframes. The unbalanced PDCCH load may be more pronounced if evolved multimedia broadcast multimedia service (eMBMS) or advanced broadcast services (ABS) is configured for the FDD CC and/or the TDD CC.

Figure 8:
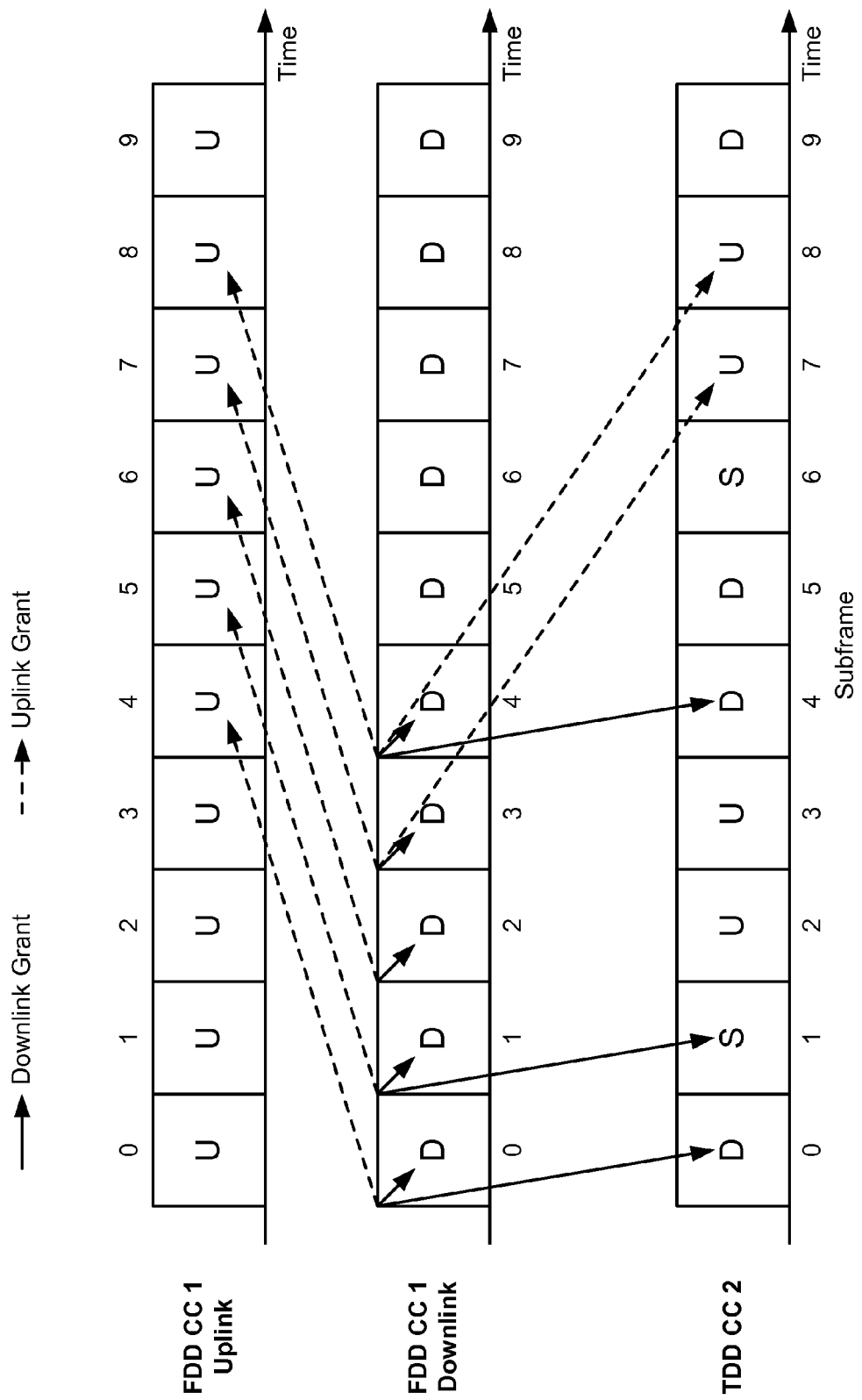
FIG. 8 shows an example of cross-carrier signaling for two CCs.

FIG. 8 shows an example of cross-carrier signaling for two CCs. In this example, an FDD CC carries grants to schedule data transmission on the FDD CC as well as a TDD CC. The TDD CC has uplink-downlink configuration 1 and includes downlink and uplink subframes shown in FIG. 8. As shown in FIG. 8, downlink grants may be sent on the FDD CC in subframes 0 to 4 to schedule downlink data transmission on the FDD CC in subframes 0 to 4, respectively. Uplink grants may be sent on the FDD CC in subframes 0 to 4 to schedule uplink data transmission on the FDD CC in subframes 4 to 8, respectively. Downlink grants may be sent on the FDD CC in subframes 0, 1 and 4 to schedule downlink data transmission on the TDD CC in subframes 0, 1 and 4, respectively. Uplink grants may be sent on the FDD CC in subframes 3 and 4 to schedule uplink data transmission on the TDD CC in subframes 7 and 8, respectively. As shown in FIG. 8, the FDD CC may carry more grants in subframe 4 than subframes 0 to 3 to schedule the FDD and TDD CCs.

In another aspect of the present disclosure, the load of the PDCCH carrying DCI for multiple CCs may be distributed more evenly across subframes. This may improve efficiency and may also reduce the maximum number of blind decodes to perform in each subframe.

In a first design of balancing the load of the PDCCH carrying DCI for multiple CCs, a flexible HARQ timeline may be used for TDD, and all or most subframes of an FDD CC can carry grants for some subframes of a TDD CC. For example, in the example shown in FIG. 8, an uplink grant may be sent on the FDD CC in subframe 0, 1, 2 or 3 to schedule uplink data transmission on the TDD CC in subframe 8. This design may provide more flexibility in sending grants on the FDD CC to schedule data transmission on the TDD CC.

In a second design of balancing the load of the PDCCH carrying DCI for multiple CCs, search space sharing may vary from subframe to subframe such that the maximum number of blind decodes in each subframe is below or at a target value. In subframes of a FDD CC carrying only downlink grants (or only uplink grants) for a TDD CC, search space sharing may be possible even if the DCI sizes are different as long as the maximum number of blind decodes is below or at the target value.

For the example shown in FIG. 8, a UE may perform a total of 96 blind decodes in subframe 4 of the FDD CC without search space sharing, or 48 blind decodes for three DCI sizes for the UE-specific search space for the FDD CC and another 48 blind decodes for three DCI sizes for the UE-specific search space for the TDD CC. The UE may perform a total of 96 blind decodes in subframe 4 with search space sharing if the FDD and TDD CCs have the same DCI sizes. The UE may perform a total of 80 blind decodes in subframe 0 of the FDD CC without search space sharing, or 48 blind decodes for three DCI sizes for the UE-specific search space for the FDD CC and another 32 blind decodes for two DCI sizes for the UE-specific search space for the TDD CC. Search space sharing may be relaxed in subframe 0 such that the UE can perform up to 96 blind decodes. For example, DCI (e.g., downlink grants or uplink grants) for the FDD CC having a different size may be sent in the UE-specific search space for the TDD CC. In this case, the UE may perform a total of 48 blind decodes for the UE-specific search space for the TDD CC in subframe 0, or 32 blind decodes for the two DCI sizes for the TDD CC and 16 blind decodes for the one DCI size for the FDD CC with cross-subframe signaling. As another example, DCI (e.g., downlink grants) for the TDD CC having a different size may be sent in the UE-specific search space for the FDD CC in subframe 0.

Search space sharing may vary across subframes, depending on which DCI is sent in each subframe, such that the maximum number of blind decodes is below or at the target value in each subframe. Subframe-dependent search space sharing may be used for an FDD CC carrying DCI for both FDD and TDD CCs, as described above. Subframe-dependent search space sharing may also be used for a TDD CC carrying DCI for both FDD and TDD CCs. Search space sharing may vary across subframes based on various factors such as how cross-carrier signaling is used for scheduling, the HARQ timeline of each CC, etc.

In one design, search space sharing may be supported even when there is no cross-carrier signaling. In this case, the UE-specific search spaces for different CCs are located on different CCs (instead of on the same CC with cross-carrier signaling). Search space sharing without cross-carrier signaling may be used for PDCCH load balancing, improved scheduling flexibility, etc.

In one design, a PDCCH CC for a PDSCH CC may be different from a PDCCH CC for a PUSCH CC. For search space sharing, downlink grants for the PDSCH CC may be sent on the PDCCH CC for the PDSCH CC or the PDCCH CC for the PUSCH CC. Similarly, uplink grants for the PUSCH CC may be sent on the PDCCH CC for the PUSCH CC or the PDCCH CC for the PDSCH CC. Downlink grants and uplink grants for the same CC may be sent on different CCs for PDCCH load balancing, better HARQ timing management, etc.

In LTE, a downlink subframe of a TDD CC may carry one uplink grant scheduling multiple uplink subframes of the TDD CC. For example, one uplink grant may be sent in a downlink subframe of a TDD CC with uplink-downlink configuration 0 in LTE Releases 8 to 10 to schedule uplink transmissions in two uplink subframes. More than two uplink subframes may be scheduled in a downlink subframe of a TDD CC in LTE Release 10+. Each uplink grant may include an N-bit uplink subframe indication that indicates specific uplink subframe(s) for which the uplink grant is applicable. A downlink subframe of a TDD CC may have more resources allocated for the PHICH as compared to a downlink subframe of an FDD CC. Uplink grants may be sent either via increased bitwidth (e.g., to three bits to support three uplink grants) or via a 2-bit uplink subframe indication combined with higher layer configuration indicating which two uplink subframes are active. Similarly, PHICH resources may be increased to three or remain at two with higher layer configuration indicating which one (out of two) to use or potentially with some offset.

FIG. 9 shows a design of a process 900 for sending control information. Process 900 may be performed by a base station/eNB (as described below) or by some other entity. The base station may determine first and second CCs configured for a UE for carrier aggregation (block 912). The first and second CCs may be associated with first and second control messages, respectively, having different definitions. For example, one CC may be configured for FDD, and the other CC may be configured for TDD. The base station may send first control information for the first CC based on a definition of the second control message for the second CC (block 914).

The first and second control messages may be for the same control message format or type (e.g., DCI format 1A in LTE). The first and second control messages may have different definitions, which may be characterized in various manners. In one design, the first control message may be associated with a first set of control information fields, and the second control message may be associated with a second set of control information fields (e.g., as shown in Table 3 for DCI format 1A in LTE). The first control information for the first CC may be sent based on the second set of control information fields for the second control message. In another design, the control message for one CC may include a control information field that is not included in the control message for the other CC. In yet another design, the first and second control messages may include a control information field having different bitwidths for the first and second control messages. The first and second control messages may have the same message size or different message sizes. The base station may determine the size of the first control information for the first CC based on a message size of the second control message for the second CC or a predetermined message size applicable for both the first and second CCs.

The base station may send the first control information for the first CC on the second CC or another CC. If the first control information is sent on the second CC, then data transmission on the first CC may be based on a HARQ timeline for the second CC on which the first control information for the first CC is sent.

The UE may be configured with a plurality of CCs including the first and second CCs. In one design, control information for the plurality of CCs may be sent on the second CC based on a predetermined message size or a largest message size among a plurality of control messages associated with the plurality of CCs. In another design, the second control message for the second CC may have a larger message size than the first control message for the first CC, and the first control information for the first CC may be sent using at least one additional control information field (e.g., a CIF) not included in the first control message for the first CC. In yet another design, a control message for a CC carrying a downlink control channel (e.g., the PDCCH) for the UE may be used to send control information for the plurality of CCs. The second control message for the second CC may be used to send the first control information for the first CC due to the second CC carrying the downlink control channel for the UE. In yet another design, a control message for a CC carrying an uplink control channel (e.g., the PUCCH) for the UE may be used to send control information for the plurality of CCs. The second control message for the second CC may be used to send the first control information for the first CC due to the second CC carrying the uplink control channel for the UE.

In one design, each CC configured for the UE may be associated with a respective search space for sending control information to the UE. The first and second CCs may be associated with first and second search spaces, respectively, for sending control information to the UE. The first and second search spaces may be on the second CC on which control information is sent to the UE. The base station may send the first control information for the first CC in the first search space or the second search space. In one design, the base station may send the first control information for the first CC in the second search space only when the first and second control messages have the same message size. In another design, the base station may send the first control information for the first CC in the second search space even when the first and second control messages have different message sizes. In one design, the second search space for the second CC may be available for sending control information for the first CC in only a subset of downlink subframes. In another design, the first and second search spaces may be available in different downlink subframes. These designs may balance blind decoding for search space sharing. The base station may send control information for the plurality of CCs in a manner to limit the maximum number of blind decodes performed by the UE in each subframe to less than a target value.

In one design, the base station may send the first control information for the first CC and second control information for the first CC on different CCs. The first control information may schedule downlink data transmission and the second control information may schedule uplink data transmission for the UE. The base stations may thus send downlink grants and uplink grants on different CCs. In another design, the first control information for the first CC may schedule data transmission in a plurality of subframes for the UE. The plurality of subframes may be determined based on the first control information and/or a semi-static configuration for the UE.

FIG. 10 shows a design of a process 1000 for receiving control information. Process 1000 may be performed by a UE (as described below) or by some other entity. The UE may determine first and second CCs configured for the UE (block 1012). The first and second CCs may be associated with first and second control messages, respectively, having different definitions. The first and second control messages may have different definitions due to any of the characteristics described above. One CC may be configured for FDD, and the other CC may be configured for TDD. The UE may receive first control information for the first CC sent based on a definition of the second control message for the second CC (block 1014). The UE may receive the first control information for the first CC on the second CC or some other CC.

The UE may be configured with a plurality of CCs including the first and second CCs. In one design, control information for the plurality of CCs may be sent on the second CC based on a predetermined message size or a largest message size among a plurality of control messages associated with the plurality of CCs. In another design, the second control message for the second CC may have a larger message size than the first control message for the first CC. The first control information for the first CC may be sent using at least one additional control information field not included in the first control message for the first CC. In yet another design, a control message for a CC carrying a downlink control channel (e.g., the PDCCH) for the UE may be used to send control information for the plurality of CCs. In yet another design, a control message for a CC carrying an uplink control channel (e.g., the PUCCH) for the UE may be used to send control information for the plurality of CCs.

In one design, the first and second CCs may be associated with first and second search spaces, respectively, for sending control information to the UE. The UE may receive the first control information for the first CC sent in the first search space or the second search space.

In one design, the UE may receive the first control information for the first CC and second control information for the first CC on different CCs. The first control information may schedule downlink data transmission and the second control information may schedule uplink data transmission for the UE. In another design, the first control information for the first CC may schedule data transmission in a plurality of subframes for the UE.

Figure 11:
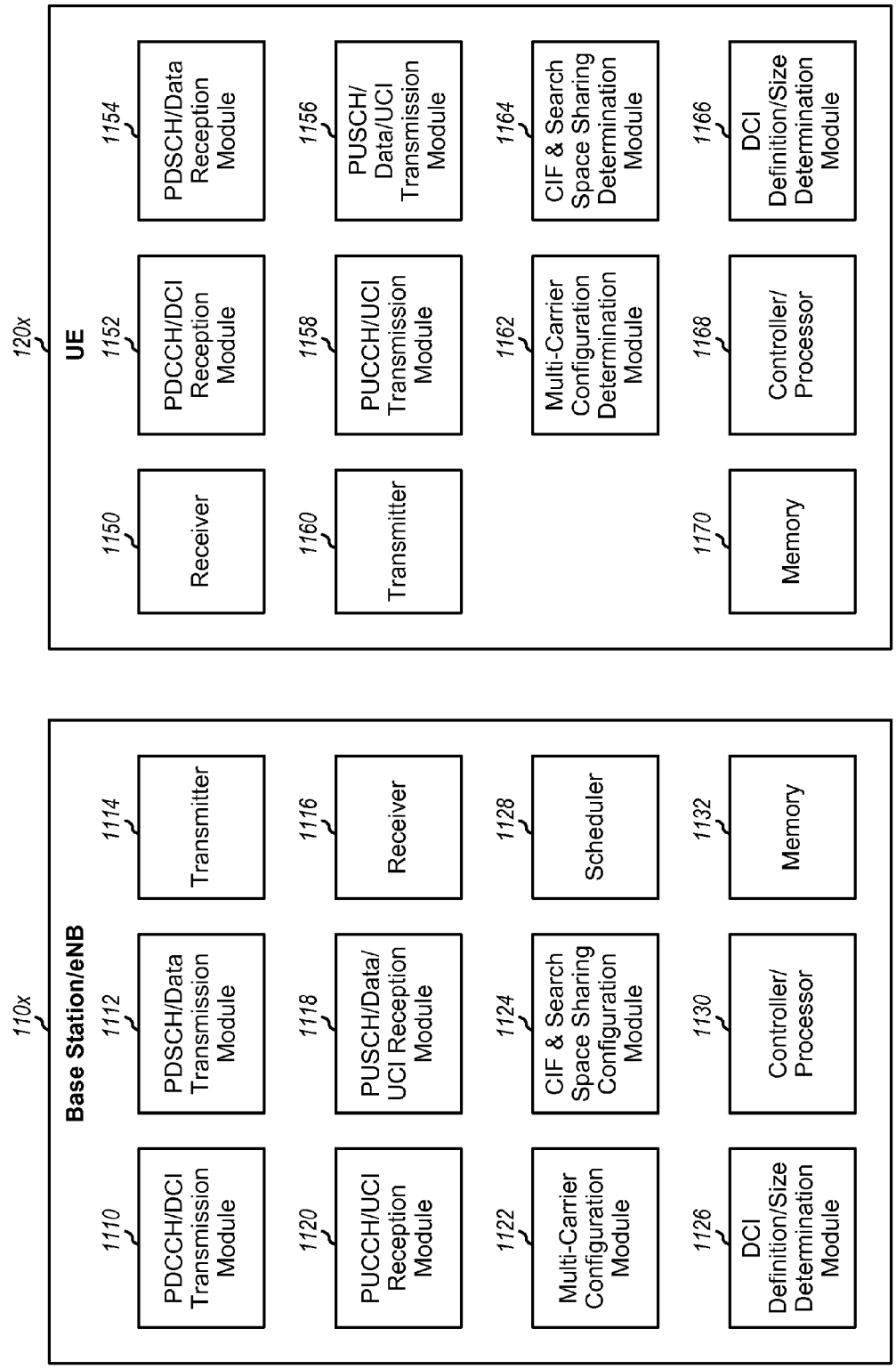
FIG. 11 shows a block diagram of a base station and a UE.

FIG. 11 shows a block diagram of a design of a base station/eNB 110x and a UE 120x, which may be one of the base stations/eNBs and one of the UEs in FIG. 1. Within base station 110x, a module 1110 may generate PDCCH transmissions comprising downlink grants, uplink grants, and/or other DCI for one or more CCs. A module 1112 may generate PDSCH transmissions comprising data and/or other information for one or more CCs. A transmitter 1114 may generate one or more downlink signals comprising the PDCCH and/or PDSCH transmissions. A receiver 1116 may receive and process uplink signals transmitted by UE 120x and other UEs. A module 1120 may process received PUCCH transmissions to recover UCI and/or other information sent by UE 120x and/or other UEs. A module 1118 may process received PUSCH transmissions to recover data and/or UCI sent by UE 120x and/or other UEs. A module 1122 may determine a carrier aggregation/multi-carrier configuration of UE 120x, e.g., determine which CCs are configured for UE 120x. A module 1124 may determine cross-carrier signaling and/or search space sharing applicable for UE 120x. A module 1126 may determine one or more DCI definitions and/or sizes to use for sending DCI to UE 120x. The various modules within base station 110x may operate as described above. A controller/processor 1130 may direct the operation of various modules within base station 110x. A memory 1132 may store data and program codes for base station 110x. A scheduler 1128 may schedule UEs for data transmission on the downlink and uplink.

Within UE 120x, a receiver 1150 may receive and process downlink signals from base station 110x and other base stations. A module 1152 may process (e.g., demodulate and decode) received PDCCH transmissions to recover DCI and/or other information sent to UE 120x. A module 1154 may process received PDSCH transmissions to recover data and/or other information sent to UE 120x. A module 1158 may generate PUCCH transmissions comprising UCI and/or other information for one or more CCs. A module 1156 may generate PUSCH transmissions comprising data and/or UCI for one or more CCs. A transmitter 1160 may generate one or more uplink signals comprising the PUCCH and/or PUSCH transmissions. A module 1162 may determine a carrier aggregation/multi-carrier configuration of UE 120x, e.g., determine which CCs are configured for UE 120x. A module 1164 may determine cross-carrier signaling and/or search space sharing applicable for UE 120x. A module 1166 may determine one or more DCI definitions and/or sizes to use for receiving DCI. The various modules within UE 120x may operate as described above. A controller/processor 1168 may direct the operation of various modules within UE 120x. A memory 1170 may store data and program codes for UE 120x.

The modules in FIG. 11 may comprise processors, electronic devices, hardware devices, electronic components, logical circuits, memories, software codes/firmware codes, etc., or combinations thereof.

Figure 12:
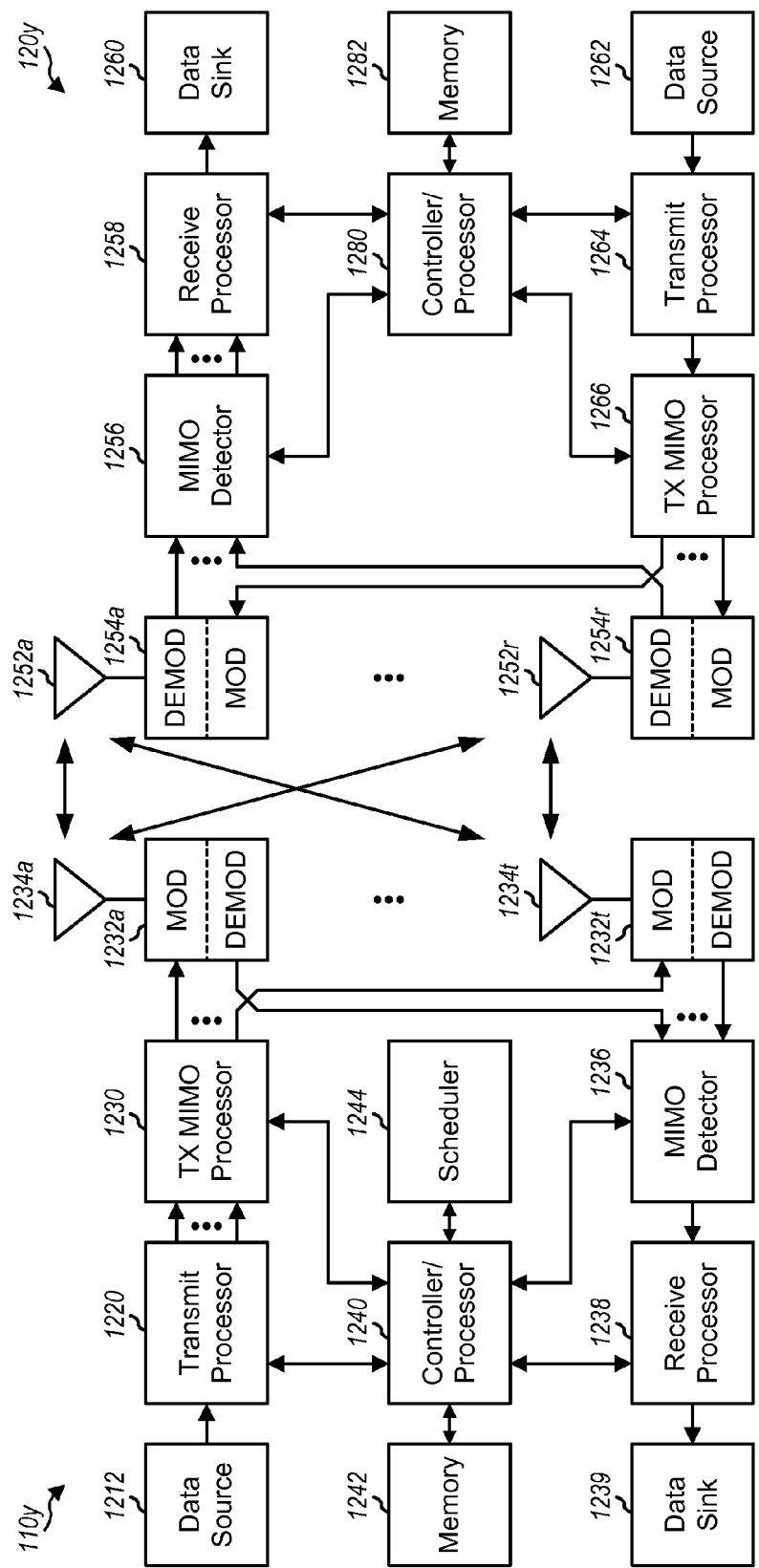
FIG. 12 shows another block diagram of a base station and a UE.

FIG. 12 shows a block diagram of a design of a base station/eNB 110y and a UE 120y, which may be one of the base stations and one of the UEs in FIG. 1. Base station 110y may be equipped with T antennas 1234a through 1234t, and UE 120y may be equipped with R antennas 1252a through 1252r, where in general T≥1 and R≥1.

At base station 110y, a transmit processor 1220 may receive data from a data source 1212 for one or more UEs, process (e.g., encode and modulate) the data for each UE based on one or more modulation and coding schemes selected for that UE, and provide data symbols for all UEs. Transmit processor 1220 may also process DCI (e.g., downlink grants, uplink grants, etc.) and provide control symbols. Processor 1220 may also generate reference symbols for one or more reference signals. A transmit (TX) MIMO processor 1230 may precode the data symbols, the control symbols, and/or the reference symbols (if applicable) and may provide T output symbol streams to T modulators (MOD) 1232a through 1232t. Each modulator 1232 may process its output symbol stream (e.g., for OFDM, etc.) to obtain an output sample stream. Each modulator 1232 may further condition (e.g., convert to analog, amplify, filter, and upconvert) its output sample stream to obtain a downlink signal. T downlink signals from modulators 1232a through 1232t may be transmitted via T antennas 1234a through 1234t, respectively.

At UE 120y, antennas 1252a through 1252r may receive the downlink signals from base station 110y and/or other base stations and may provide received signals to demodulators (DEMODs) 1254a through 1254r, respectively. Each demodulator 1254 may condition (e.g., filter, amplify, downconvert, and digitize) its received signal to obtain input samples. Each demodulator 1254 may further process the input samples (e.g., for OFDM, etc.) to obtain received symbols. A MIMO detector 1256 may obtain received symbols from all R demodulators 1254a through 1254r, perform MIMO detection, and provide detected symbols. A receive processor 1258 may process (e.g., demodulate and decode) the detected symbols, provide decoded data for UE 120y to a data sink 1260, and provide decoded DCI to a controller/processor 1280.

At UE 120y, a transmit processor 1264 may receive and process data from a data source 1262 and UCI (e.g., CSI, ACK/NACK, etc.) from controller/processor 1280. Processor 1264 may also generate reference symbols for one or more reference signals. The symbols from transmit processor 1264 may be precoded by a TX MIMO processor 1266 if applicable, further processed by modulators 1254a through 1254r (e.g., for SC-FDM, OFDM, etc.), and transmitted. At base station 110y, the uplink signals from UE 120y and other UEs may be received by antennas 1234, processed by demodulators 1232, detected by a MIMO detector 1236 if applicable, and further processed by a receive processor 1238 to obtain decoded data and UCI sent by UE 120y and other UEs. Processor 1238 may provide the decoded data to a data sink 1239 and the decoded UCI to controller/processor 1240.

Controllers/processors 1240 and 1280 may direct the operation at base station 110y and UE 120y, respectively. Processor 1240 and/or other processors and modules at base station 110y may perform or direct process 900 in FIG. 9 and/or other processes for the techniques described herein. Processor 1280 and/or other processors and modules at UE 120y may perform or direct process 1000 in FIG. 10 and/or other processes for the techniques described herein. Memories 1242 and 1282 may store data and program codes for base station 110y and UE 120y, respectively. A scheduler 1244 may schedule UEs for data transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or combinations thereof. A software/firmware module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

The invention claimed is:

1. A method for wireless communication, comprising:
determining first and second component carriers (CCs) configured for a user equipment (UE), the first and second CCs being associated with first and second control messages, respectively, having different definitions; and
sending first control information for the first CC based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Time Division Duplex (TDD) and the second CC is configured for Frequency Division Duplex (FDD), wherein first control information for the first CC comprises Downlink Control Information (DCI) for the first CC sent using a DCI format configured for FDD.

2. The method of claim 1, wherein the first and second control messages are for a same control message format.

3. The method of claim 1, wherein the first and second control messages have different message sizes.

4. The method of claim 1, wherein the second control message includes a control information field not included in the first control message.

5. The method of claim 1, wherein the first and second control messages include a control information field having different bitwidths for the first and second control messages.

6. The method of claim 1, wherein the sending the first control information for the first CC comprises sending the first control information for the first CC on the second CC.

7. The method of claim 6, wherein data transmission on the first CC is based on a hybrid automatic repeat request (HARQ) timeline for the second CC on which the first control information for the first CC is sent.

8. The method of claim 1, wherein the UE is configured with a plurality of CCs including the first and second CCs.

9. The method of claim 8, wherein control information for the plurality of CCs is sent on the second CC based on a predetermined message size or a largest message size among a plurality of control messages associated with the plurality of CCs.

10. The method of claim 8, wherein a control message for a CC carrying a downlink control channel for the UE is used to send control information for the plurality of CCs, and wherein the second control message for the second CC is used to send the first control information for the first CC due to the second CC carrying the downlink control channel for the UE.

11. The method of claim 8, wherein a control message for a CC carrying an uplink control channel for the UE is used to send control information for the plurality of CCs, and wherein the second control message for the second CC is used to send the first control information for the first CC due to the second CC carrying the uplink control channel for the UE.

12. The method of claim 8, further comprising:
sending control information for the plurality of CCs to limit a maximum number of blind decodes performed by the UE in each subframe to less than a target value.

13. The method of claim 1, wherein the second control message for the second CC has a larger message size than the first control message for the first CC, and wherein the first control information for the first CC is sent using at least one additional control information field not included in the first control message for the first CC.

14. The method of claim 13, wherein the at least one additional control information field includes a cross-carrier indicator field (CIF).

15. The method of claim 1, wherein the first CC is associated with a first search space for sending control information to the UE, and wherein the second CC is associated with a second search space for sending control information to the UE.

16. The method of claim 15, wherein the first search space and the second search space are on the second CC.

17. The method of claim 15, wherein the sending the first control information for the first CC comprises sending the first control information for the first CC in the first search space or the second search space.

18. The method of claim 15, wherein the sending the first control information for the first CC comprises sending the first control information for the first CC in the second search space only when the first and second control messages have a same message size.

19. The method of claim 15, wherein the sending the first control information for the first CC comprises sending the first control information for the first CC in the second search space even when the first and second control messages have different message sizes.

20. The method of claim 15, wherein the second search space for the second CC is available for sending control information for the first CC in a subset of downlink subframes.

21. The method of claim 15, wherein the first search space and the second search space are available in different downlink subframes.

22. The method of claim 1, further comprising:
sending the first control information for the first CC and second control information for the first CC on different CCs, wherein the first control information schedules downlink data transmission and the second control information schedules uplink data transmission for the UE.

23. The method of claim 1, wherein the first control information for the first CC schedules data transmission in a plurality of subframes for the UE.

24. The method of claim 23, wherein the plurality of subframes are determined based on the first control information for the first CC, or a semi-static configuration for the UE, or both.

25. An apparatus for wireless communication, comprising:
means for determining first and second component carriers (CCs) configured for a user equipment (UE), the first and second CCs being associated with first and second control messages, respectively, having different definitions; and
means for sending first control information for the first CC based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Time Division Duplex (TDD) and the second CC is configured for Frequency Division Duplex (FDD), wherein first control information for the first CC comprises Downlink Control Information (DCI) for the first CC sent using a DCI format configured for FDD.

26. The apparatus of claim 25, wherein the UE is configured with a plurality of CCs including the first and second CCs, and wherein control information for the plurality of CCs is sent on the second CC based on a predetermined message size or a largest message size among a plurality of control messages associated with the plurality of CCs.

27. The apparatus of claim 25, wherein the second control message for the second CC has a larger message size than the first control message for the first CC, and wherein the first control information for the first CC is sent using at least one additional control information field not included in the first control message for the first CC.

28. The apparatus of claim 25, wherein the UE is configured with a plurality of CCs including the first and second CCs, wherein a control message for a CC carrying a downlink control channel for the UE is used to send control information for the plurality of CCs, and wherein the second control message for the second CC is used to send the first control information for the first CC due to the second CC carrying the downlink control channel for the UE.

29. The apparatus of claim 25, wherein the UE is configured with a plurality of CCs including the first and second CCs, wherein a control message for a CC carrying an uplink control channel for the UE is used to send control information for the plurality of CCs, and wherein the second control message for the second CC is used to send the first control information for the first CC due to the second CC carrying the uplink control channel for the UE.

30. An apparatus for wireless communication, comprising:
at least one processor configured to:
determine first and second component carriers (CCs) configured for a user equipment (UE), the first and second CCs being associated with first and second control messages, respectively, having different definitions; and
send first control information for the first CC based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Time Division Duplex (TDD) and the second CC is configured for Frequency Division Duplex (FDD), wherein first control information for the first CC comprises Downlink Control Information (DCI) for the first CC sent using a DCI format configured for FDD.

31. The apparatus of claim 30, wherein the UE is configured with a plurality of CCs including the first and second CCs, and wherein control information for the plurality of CCs is sent on the second CC based on a predetermined message size or a largest message size among a plurality of control messages associated with the plurality of CCs.

32. The apparatus of claim 30, wherein the second control message for the second CC has a larger message size than the first control message for the first CC, and wherein the first control information for the first CC is sent using at least one additional control information field not included in the first control message for the first CC.

33. The apparatus of claim 30, wherein the UE is configured with a plurality of CCs including the first and second CCs, wherein a control message for a CC carrying a downlink control channel for the UE is used to send control information for the plurality of CCs, and wherein the second control message for the second CC is used to send the first control information for the first CC due to the second CC carrying the downlink control channel for the UE.

34. The apparatus of claim 30, wherein the UE is configured with a plurality of CCs including the first and second CCs, wherein a control message for a CC carrying an uplink control channel for the UE is used to send control information for the plurality of CCs, and wherein the second control message for the second CC is used to send the first control information for the first CC due to the second CC carrying the uplink control channel for the UE.

35. A computer program product, comprising:
a non-transitory computer-readable medium comprising:
code for causing at least one computer to determine first and second component carriers (CCs) configured for a user equipment (UE), the first and second CCs being associated with first and second control messages, respectively, having different definitions; and
code for causing the at least one computer to send first control information for the first CC based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Time Division Duplex (TDD) and the second CC is configured for Frequency Division Duplex (FDD), wherein first control information for the first CC comprises Downlink Control Information (DCI) for the first CC sent using a DCI format configured for FDD.

36. A method for wireless communication, comprising:
determining first and second component carriers (CCs) configured for a user equipment (UE), the first and second CCs being associated with first and second control messages, respectively, having different definitions; and
receiving first control information for the first CC sent based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Time Division Duplex (TDD) and the second CC is configured for Frequency Division Duplex (FDD), wherein first control information for the first CC comprises Downlink Control Information (DCI) for the first CC sent using a DCI format configured for FDD.

37. The method of claim 36, wherein the receiving the first control information for the first CC comprises receiving the first control information for the first CC on the second CC.

38. The method of claim 36, wherein the UE is configured with a plurality of CCs including the first and second CCs.

39. The method of claim 38, wherein control information for the plurality of CCs is sent on the second CC based on a predetermined message size or a largest message size among a plurality of control messages associated with the plurality of CCs.

40. The method of claim 38, wherein a control message for a CC carrying a downlink control channel for the UE is used to send control information for the plurality of CCs, and wherein the second control message for the second CC is used to send the first control information for the first CC due to the second CC carrying the downlink control channel for the UE.

41. The method of claim 38, wherein a control message for a CC carrying an uplink control channel for the UE is used to send control information for the plurality of CCs, and wherein the second control message for the second CC is used to send the first control information for the first CC due to the second CC carrying the uplink control channel for the UE.

42. The method of claim 36, wherein the second control message for the second CC has a larger message size than the first control message for the first CC, and wherein the first control information for the first CC is sent using at least one additional control information field not included in the first control message for the first CC.

43. The method of claim 36, wherein the first CC is associated with a first search space for sending control information to the UE, and wherein the second CC is associated with a second search space for sending control information to the UE.

44. The method of claim 43, wherein the receiving the first control information for the first CC comprises receiving the first control information for the first CC sent in the first search space or the second search space.

45. The method of claim 36, further comprising:
receiving the first control information for the first CC and second control information for the first CC on different CCs, wherein the first control information schedules downlink data transmission and the second control information schedules uplink data transmission for the UE.

46. An apparatus for wireless communication, comprising:
means for determining first and second component carriers (CCs) configured for a user equipment (UE), the first and second CCs being associated with first and second control messages, respectively, having different definitions; and
means for receiving first control information for the first CC sent based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Time Division Duplex (TDD) and the second CC is configured for Frequency Division Duplex (FDD), wherein first control information for the first CC comprises Downlink Control Information (DCI) for the first CC sent using a DCI format configured for FDD.

47. The apparatus of claim 46, wherein the UE is configured with a plurality of CCs including the first and second CCs, and wherein control information for the plurality of CCs is sent on the second CC based on a predetermined message size or a largest message size among a plurality of control messages associated with the plurality of CCs.

48. The apparatus of claim 46, wherein the second control message for the second CC has a larger message size than the first control message for the first CC, and wherein the first control information for the first CC is sent using at least one additional control information field not included in the first control message for the first CC.

49. The apparatus of claim 46, wherein the UE is configured with a plurality of CCs including the first and second CCs, wherein a control message for a CC carrying a downlink control channel for the UE is used to send control information for the plurality of CCs, and wherein the second control message for the second CC is used to send the first control information for the first CC due to the second CC carrying the downlink control channel for the UE.

50. The apparatus of claim 46, wherein the UE is configured with a plurality of CCs including the first and second CCs, wherein a control message for a CC carrying an uplink control channel for the UE is used to send control information for the plurality of CCs, and wherein the second control message for the second CC is used to send the first control information for the first CC due to the second CC carrying the uplink control channel for the UE.

51. An apparatus for wireless communication, comprising:
at least one processor configured to
determine first and second component carriers (CCs) configured for a user equipment (UE), the first and second CCs being associated with first and second control messages, respectively, having different definitions; and
receive first control information for the first CC sent based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Time Division Duplex (TDD) and the second CC is configured for Frequency Division Duplex (FDD), wherein first control information for the first CC comprises Downlink Control Information (DCI) for the first CC sent using a DCI format configured for FDD.

52. The apparatus of claim 51, wherein the UE is configured with a plurality of CCs including the first and second CCs, and wherein control information for the plurality of CCs is sent on the second CC based on a predetermined message size or a largest message size among a plurality of control messages associated with the plurality of CCs.

53. The apparatus of claim 51, wherein the second control message for the second CC has a larger message size than the first control message for the first CC, and wherein the first control information for the first CC is sent using at least one additional control information field not included in the first control message for the first CC.

54. The apparatus of claim 51, wherein the UE is configured with a plurality of CCs including the first and second CCs, wherein a control message for a CC carrying a downlink control channel for the UE is used to send control information for the plurality of CCs, and wherein the second control message for the second CC is used to send the first control information for the first CC due to the second CC carrying the downlink control channel for the UE.

55. The apparatus of claim 51, wherein the UE is configured with a plurality of CCs including the first and second CCs, wherein a control message for a CC carrying an uplink control channel for the UE is used to send control information for the plurality of CCs, and wherein the second control message for the second CC is used to send the first control information for the first CC due to the second CC carrying the uplink control channel for the UE.

56. A computer program product, comprising:
a non-transitory computer-readable medium comprising:
code for causing at least one computer to determine first and second component carriers (CCs) configured for a user equipment (UE), the first and second CCs being associated with first and second control messages, respectively, having different definitions; and
code for causing the at least one computer to receive first control information for the first CC sent based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Time Division Duplex (TDD) and the second CC is configured for Frequency Division Duplex (FDD), wherein first control information for the first CC comprises Downlink Control Information (DCI) for the first CC sent using a DCI format configured for FDD.

57. A method for wireless communication, comprising:
determining first and second component carriers (CCs) configured for a user equipment (UE), the first and second CCs being associated with first and second control messages, respectively, having different definitions; and
sending first control information for the first CC based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Frequency Division Duplex (FDD) and the second CC is configured for Time Division Duplex (TDD), wherein first control information for the first CC comprises Downlink Control Information for (DCI) for the first CC sent using a DCI format configured for TDD.

58. An apparatus for wireless communication, comprising:
means for determining first and second component carriers (CCs) configured for a user equipment (UE), the first and second CCs being associated with first and second control messages, respectively, having different definitions; and
means for sending first control information for the first CC based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Frequency Division Duplex (FDD) and the second CC is configured for Time Division Duplex (TDD), wherein first control information for the first CC comprises Downlink Control Information for (DCI) for the first CC sent using a DCI format configured for TDD.

59. An apparatus for wireless communication, comprising:
at least one processor configured to:
determine first and second component carriers (CCs) configured for a user equipment (UE), the first and second CCs being associated with first and second control messages, respectively, having different definitions; and
send first control information for the first CC based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Frequency Division Duplex (FDD) and the second CC is configured for Time Division Duplex (TDD), wherein first control information for the first CC comprises Downlink Control Information for (DCI) for the first CC sent using a DCI format configured for TDD.

60. A computer program product, comprising:
a non-transitory computer-readable medium comprising:
code for causing at least one computer to determine first and second component carriers (CCs) configured for a user equipment (UE), the first and second CCs being associated with first and second control messages, respectively, having different definitions; and
code for causing the at least one computer to send first control information for the first CC based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Frequency Division Duplex (FDD) and the second CC is configured for Time Division Duplex (TDD), wherein first control information for the first CC comprises Downlink Control Information for (DCI) for the first CC sent using a DCI format configured for TDD.

61. A method for wireless communication, comprising:
determining first and second component carriers (CCs) configured for a user equipment (UE), the first and second CCs being associated with first and second control messages, respectively, having different definitions; and
receiving first control information for the first CC sent based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Frequency Division Duplex (FDD) and the second CC is configured for Time Division Duplex (TDD), wherein first control information for the first CC comprises Downlink Control Information for (DCI) for the first CC sent using a DCI format configured for TDD.

62. An apparatus for wireless communication, comprising:
means for determining first and second component carriers (CCs) configured for a user equipment (UE), the first and second CCs being associated with first and second control messages, respectively, having different definitions; and
means for receiving first control information for the first CC sent based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Frequency Division Duplex (FDD) and the second CC is configured for Time Division Duplex (TDD), wherein first control information for the first CC comprises Downlink Control Information for (DCI) for the first CC sent using a DCI format configured for TDD.

63. An apparatus for wireless communication, comprising:
at least one processor configured to:
determine first and second component carriers (CCs) configured for a user equipment (UE), the first and second CCs being associated with first and second control messages, respectively, having different definitions; and
receive first control information for the first CC sent based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Frequency Division Duplex (FDD) and the second CC is configured for Time Division Duplex (TDD), wherein first control information for the first CC comprises Downlink Control Information for (DCI) for the first CC sent using a DCI format configured for TDD.

64. A computer program product, comprising:
a non-transitory computer-readable medium comprising:
code for causing at least one computer to determine first and second component carriers (CCs) configured for a user equipment (UE), the first and second CCs being associated with first and second control messages, respectively, having different definitions; and
code for causing the at least one computer to receive first control information for the first CC sent based on a definition of the second control message for the second CC,
wherein the first control message includes a first set of control information fields and the second control message includes a second set of control information fields, and wherein the first control information for the first CC is sent based on the second set of control information fields for the second control message,
wherein the first CC is configured for Frequency Division Duplex (FDD) and the second CC is configured for Time Division Duplex (TDD), wherein first control information for the first CC comprises Downlink Control Information for (DCI) for the first CC sent using a DCI format configured for TDD.

\* \* \* \* \*